United States Patent
Matick et al.

(10) Patent No.: US 6,981,096 B1
(45) Date of Patent: Dec. 27, 2005

(54) MAPPING AND LOGIC FOR COMBINING L1 AND L2 DIRECTORIES AND/OR ARRAYS

(75) Inventors: Richard E. Matick, Cortlandt Manor, NY (US); Stanley Everett Schuster, Granite Springs, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/165,490

(22) Filed: Oct. 2, 1998

(51) Int. Cl.[7] .................... G06F 12/00; G06F 13/00
(52) U.S. Cl. ........................... 711/122; 711/128
(58) Field of Search ........................ 711/122, 128

(56) References Cited

U.S. PATENT DOCUMENTS

| | | | | |
|---|---|---|---|---|
| 4,797,814 A | * | 1/1989 | Brenza .................. | 364/200 |
| 5,890,221 A | * | 3/1999 | Liu et al. ............... | 711/210 |
| 5,895,487 A | * | 4/1999 | Boyd et al. ............. | 711/122 |
| 6,065,101 A | * | 5/2000 | Gilda .................... | 711/140 |

* cited by examiner

Primary Examiner—Matthew Kim
Assistant Examiner—Pierre M. Vital
(74) Attorney, Agent, or Firm—Thomas A. Beck; Louis Herzberg

(57) ABSTRACT

Architectures, methods and systems are presented which combine a multiple of directories (e. g. L1 and L2 directory) into a single directory, while still allowing the individual levels to use their own organization which is best for overall performance. This integration is performed without compromising the organization at each level. With some small additions to the L2 directory, it is used simultaneously to perform both the L1 and L2 directory functions. Additionally, the same organizational structure allows the L2 array to serve both as a traditional L1 and simultaneous L2 array. In one aspect of the present invention an architecture is provided for a first and second level memory hierarchy, or cache, including a first data storage array for the first level memory hierarchy; a second data storage array for the second level memory hierarchy, a single address translation directory combining the directories for the first and second level memory hierarchy into a single directory satisfying the organization requirements of both the first and second level memory hierarchy. Also provided is a system having three level memory hierarchy comprising: a single combined directory used to serve each of three separate storage arrays. Each of the storage arrays serves a respective level of the three level memory hierarchy wherein the organization of the various levels is not compromised by the use of the single combined directory.

8 Claims, 19 Drawing Sheets

MAPPING AND LOGIC FOR COMBINING L1 AND L2 DIRECTORIES AND/OR ARRAYS

This application is related to another application which is currently pending in the USPTO, entitled, "Cache Performance Improvement Through The Use Of Early Select Techniques And Pipelining," filed on Jul. 7, 1997 assigned Ser. No., 08/888,730, and is herein incorporated in totality by reference.

FIELD OF THE INVENTION

The present invention is directed to the field of computer memory systems. It is more particularly directed to cache memory hierarchy.

BACKGROUND OF THE INVENTION

With the advent of integrated memory and logic on one high performance chip, various opportunities become available for improving system performance. One significant enhancement is the ability to integrate two levels of a memory hierarchy together with a CPU on one chip. For instance, referring to FIG. 1, a processor with its cache, L1, and the next higher level which serves it, namely L2, can be integrated on the emerging type of chips. Referring to FIG. 1, in such a system, a separate L1 directory 125 and a separate L2 directory 135 as well as storage arrays 120, 130 are used for each level. Each such directory has its own access decoders, compare circuits and associated logic to search for cache blocks in the respective storage arrays. Each level could, and might have a different set-associativity, as well as cache organization. For instance a level L1 cache is often organized as a late-select, set-associative cache. However, the L2 level associated with it might use a sequential organization, or an early-select organization of the type described in the referenced application, Ser. No. 08/888,730. As the cache levels continue to increase in size, the multiple directories become large, consuming non-negligible chip area. In addition, access to each directory of each level consumes power, as well as time. Thus it would be advantageous to combine multiple L1 and L2 elements into a single L1/L2 element, if possible, while still allowing the individual cache levels to use their own organization which may be best for overall performance.

In order to understand the issue of 'set-associativity' in the L1 cache, it is helpful to consider first the effect of associativity on both the L1 directory and L1 storage array (storage array can contain instructions or data) in the uncombined case. First the fundamental notions of set-associativity and a late-select organization are presented. It is shown that the larger the set-associativity, the larger are the number of compares which must be made via the directory. Also, for a late-select L1 storage array, larger set-associativity requires a much larger data access width from the arrays. Thus the set-associativity is selected for optimum speed and cost of implementation. The trade off in the L2 cache are different so the organization in terms of set-associativity and directory/storage-array organization are usually different. It is advantageous to provide all these features in a combined directory.

Since the earliest days, caches have, with few exceptions, all been organized in a set-associative configuration. This type of organization is often thought to be complex, but is extremely simple. In fact, this organization is very commonly used by everyone at one time or another, but we are just not aware of its application elsewhere. An ordinary, "tab-indexed" address book or telephone directory is a perfect analogy to a cache in every respect and is used in the following, to make the concepts understandable. The "tab-indexed" directory used is the ordinary desk-top type of phone directory which allows one to move a mechanical selector to some letter of the alphabet and then "push a button" to access the information contained under that letter. One could use an ordinary address book which has "tab-indices" on each page, just as well. In this case one would mechanically use one's fingers to select one of the tabs and lift "open" the desired page. All the principles and ideas are identical for both the address book and a mechanical tab-indexed desk directory.

In the most simple case, the DATA associated with a given "Search Address" is quite small, so both the DATA and Search Address can be contained in one physical structure. For instance, the Search Address is usually a person's Name, and the DATA is the Phone Number (or Address in the case of an Address Directory). Thus, for this case, the Search Address of the desired information, or that part of it used as the Compare Address, resides with the Data.

Such a Tab-Indexed phone directory 200 is shown in FIG. 2. One tab-index selector position is used for each letter of the alphabet. The directory entry for each such tab-index position is known as a 'congruence class'. A Congruence Class as defined herein is sometimes called a SET which differs from the word SET used herein. The reader is cautioned that there are different definitions of SET used throughout the computer industry. A 'congruence class' as defined here is sometimes called a SET with no name for what we define as a SET herein. Thus there is one congruence class for each letter of the alphabet. So all names beginning with the letter of the alphabet belonging to a given congruence class must be found here, or reloaded as needed. In our Directory, it is ASSUMED that each congruence class can contain only four entries with each entry consisting of a name plus its associated phone number.

This is EXACTLY a 4-way set-associative directory/cache and works as follows. Suppose we had previously reloaded congruence class K with four names shown in the Directory, namely Kern, Kagan, Knoll, and Krons. Internal to the directory, we do not have to include the letter K with each name since the external mechanical selector picks (translates) the letter K—the names cannot start with any other letter in this congruence class. (In an actual phone directory, we normally include the first letter as well, but only for convenience—it is fundamentally unnecessary). This K congruence class contains the numbers, 1745 for Kern 221, 2391 for Kagan 222, etc. Now suppose we wish to find the number for Kagan, which is the full address appearing in our address register at the top of FIG. 2. The first letter, K, is used to access the K congruence class by moving the tab-index selector to the letter K as shown. We "Open" the directory for this selection and retrieve four names and four numbers. The remaining portion of the starting address, namely "AGAN" (without the K) is compared "in our brains" with the four names accessed. If a match occurs, then we select the corresponding phone number (or address in an Address Directory) for use. In this case, a match (HIT) occurs on the second entry in the K congruence class, so the second number is chosen.

Note that for the general case, the arrangement of the 4 names in the congruence class is purely random for reasons discussed below. This random arrangement plus the fact that there can be no direct address relation between the large number of names and the 4 possible locations in a congruence class, requires us to perform an associative search on 4 entries, i.e. we compare the full character string with the given Search Address. The 4 compares makes this a 4 way-set-associative directory. If we had 8 entries per congruence class, then 8 associative compares would be required and would constitute an 8-way set-associative directory. If no compare match was obtained, a MISS has resulted, requiring a reload. The Reloading strategy of a Miss is the mechanism which causes the 4 entries of a congruence class to be randomly arranged. This occurs as follows. When a Miss occurs for some given name, the usual strategy, and the one used for caches, is to subsequently enter that name into the directory under the assumption that it will be used a lot, for later accesses, i. e. perform a Reload. Under this assumption, the question then becomes, "Which entry to replace?" This has been the subject of considerable research over the years, but the most common and widely used strategy is to replace the entry which is LEAST RECENTLY USED (LRU). In a cache, there are special bits in each congruence class for keeping track of this usage. we could do the same in the phone directory, but usually do not bother. Rather, we would just look at the 4 names and use some similar criterion, such as, "which entry is least often used, or least important?" Since the physical location of this entry in the congruence class, in general, occur at random, there is no ORDER to the arrangement of entries in any congruence class.

In an actual cache, the "block" of data associated with each Search Address is usually many times larger than just a phone number or address, so the DATA storage space required is many times larger than the Search Address needed for the associative compares. As a result, the DATA is maintained in an array which is separate from the Search Address array. The latter is generally referred to as the Directory Array, or Tag Array. As a result, some mapping structure is required to relate the directory addresses to the corresponding data in the separate array.

The following describes directory-data array cache organization and accessing. Consider once again the above case in which both the Search Address for comparing, and the data reside in the same directory. Imagine that we wish to increase the size of the data by adding various records, such as home Address, Dept. Social Security#, work history, financial data, etc. shown in the box 220 in FIG. 2. we would also only need to access selected portions of this data at different times, e.g. find the Dept. or Social Security# or address, or whatever for a given person. However, if we keep it all as shown in FIG. 2, every inquiry accesses all the data for each of the 4 members of the congruence class which is not only inconvenient, but rather difficult to do in an actual random access storage array. A much better solution is to just store the data in a separate storage array, and maintain the same logical relationship between Search Address and data. Such a logical structure is the basis for a Late-Select organization.

A perfect analogy to an actual late-select organization can be obtained by using two of the tab-indexed directories, of the type used above, as illustrated in FIG. 3(a). The addresses are contained in the Directory on the left side 200, while the data, phone numbers and all other corresponding records are contained in the Storage Array on the right side 300.

There is still one congruence class for each letter of the alphabet. Also, there is still an exact one to one correspondence between addresses in the Directory and data in the array. In addition, we can easily include additional decoding on only the storage array, to select desirable fields on a finer level than previously. The usage of this structure is fully analogous to that used previously. Suppose we want to again use Kagan as the Search Address, but suppose we want to get the Department name (Dept.) 331 rather than phone number. Once again, we index to the K tab on both the directory array 200 and storage 300 array. we also provide another address field to the Storage array 300 only, namely, the lower address bits for the "Dept" field 331. Thus, the directory accesses 4 compare-addresses and the storage array accesses the 4 corresponding Department names. A compare HIT in the directory provides an Enable signal 341 to the storage array 300 for the correct 1 of 4 Dept.names as shown in FIG. 3. This is exactly the way a typical late-select cache works.

Notice that in the example above, access to the array was done at the same time as access to the directory. By the time the four address compares are completed, the four possible data fields are also accessed so it is only necessary to select one of the four using the compare HIT enable signal. In an actual cache, the directory and storage array would generally both be arrays of Static RAM devices with appropriate address decoders, sense amplifiers, etc. An address K (in binary) would be applied to both arrays and the internal information would be latched at the edge of each array in sense amplifier/latches. The directory has four compare circuits on the periphery of the array which does the remaining address matching. If a match is obtained, a direct enable signal is sent to the corresponding register on the storage array and the data is gated off to its destination, usually the processor. This is called a late-select organization since the data is accessed simultaneously with the addresses. If a COMPARE=Hit ("match") occurs in the directory, the late-select signal from this match only has to enable the data out of the latch on the edge of the storage array. Late-select is an extremely fast organization for accessing a cache and used widely for the L1 cache level. If the directory and array can each be accessed in one processor cycle, which is usually the case, then a so-called one-cycle cache is achieved. This is facilitated by separating the Search Address directory 200 from the storage array 300, since one large array would be slower than 2 separate arrays in parallel as is used here. If a late-select organization is not used, some other method of identifying the desired L1 data logical word is needed. Depending on the method chosen, the directory could require additional address bits for this purpose. We do not consider such cases, but this would be important for determining the number of bits saved by a combined directory as is done later.

Now we consider the L2 Cache Organization. In an L2, the storage array is typically much slower than the L2 directory and usually requires multiple processor cycles to access the data. Also, the data path to the storage array typically accesses a full L1 block rather than a logical word. It is typically a 128 to 256 byte block Vs 8 byte L1 logical word. As a result, it usually makes no sense to use a late-select L2 organization. Thus the L2 directory/storage array access organization is often a sequential one in which the directory is accessed first, followed by access of the storage array. For a sequential organization, the storage array can still be logically partitioned into sets as for the late-select case above. However, the previous late-select signal which identifies the set is obtained before accessing the storage array, so this signal becomes part of the storage array address for the initial access. The L2 directory access could be accessed at the same time as the L1, and aborted if not needed.

The L2 Early Select Organization is as follows. The basic concept can again be illustrated with the aid of the phone directory 350 and storage array 360 as shown in FIG. 3(b). The storage array typically has an access time significantly greater than the directory. Initially any access is started simultaneously to the directory 350 and the array 360. In our phone directory 350/array 360 example, we would access the directory 350 identically to that previously in the late-select or sequential cases. However, we only do a partial access into the data array. In this case, we just move the tab index selector. It is assumed, for instance, that since the data array is large and slow, the time to move this array index selector may equal the time to do a full directory access and address compares. Once the latter are completed, we can then decide, if Hit or Miss, to Continue or Abort the remainder of the array access. If the directory Misses and causes an Abort, we can start a new access immediately without having to wait for a full, useless array access. Obviously, the storage array 360 must have this inherent partial access and Abort/Continue capability. This could be achieved with some small modifications to a standard DRAM or SRAM array. For example, this initial access into the array could be the physical word line decoding up to, but not including the word driver. This would be the equivalent of moving the array index selector 362 in FIG. 3(*b*). On a directory Hit, the Early Select signal would enable the word line driver and remainder of the array access. A directory Miss would Abort the word line driving, and reset the word decoding for the next access on the next cycle. In this manner, one full cycle of access could be eliminated from the array access, depending on the actual array access parameters.

SUMMARY OF THE INVENTION

Thus it is an object of this invention to combine multiple directories (e.g. L1 and L2 directory) into a single L1/L2 directory, while still allowing the individual levels to use their own organization which is best for overall performance. This invention provides a method to perform such integration without compromising the organization at each level. With some small additions to the L2 directory, it is used simultaneously to perform both the L1 and L2 directory functions. Additionally, the same organizational structure allows the L2 array to serve both as a traditional L1 and simultaneous L2. These two concepts, a combined L1/L2 directory, and combined L1/L2 array are described separately herein.

In one aspect of the present invention an architecture is provided for a first and second level memory hierarchy, or cache, comprising a first data storage array for the first level memory hierarchy; a second data storage array for the second level memory hierarchy, a single address translation directory combining the directories for the first and second level memory hierarchy into a single directory satisfying the organization requirements of both the first and second level memory hierarchy.

In an embodiment of the architecture, the first data storage array is smaller and having a same, or different, organization and set-associativity with respect to the second data storage array, the single address translation directory providing an apparent set-associativity of the first level memory hierarchy to be the same, or different, as that of the second level memory hierarchy; and/or the single directory employs a set of address decoders and compare circuits for performing address translation of both the first and second level memory hierarchy; and/or the directory is organized into islands, with each island containing a number of blocks equal to that in the first level memory cache, each island having one set of address decoders and sensing circuits which are used for both the first and second level translation and replacement lookup; and/or the single directory is organized into a plurality of islands, with each of the islands including a number of blocks equal to that in the first level memory hierarchy, and all islands sharing common compare circuits for both the first and second memory hierarchy; and/or the single directory is organized into islands, with each island containing a number of blocks equal to that in the first level memory hierarchy, and where the number of compares necessary regardless of the set-associativity of the first level memory hierarchy is equal to the set-associativity of the second level memory hierarchy; and/or the first and second data storage arrays are implemented as a single storage array serving both the first and second levels of the memory hierarchy.

In another aspect of the present invention a method is provided implementing a single directory for a first and second level memory hierarchy, and mapping to any set of the second level of memory hierarchy any set of the first level of the memory hierarchy by means of at least one Set bit; and/or implementing a single directory for two levels of a memory hierarchy, and allowing both levels of the memory hierarchy to be interrogated simultaneously; and/or implementing a single directory for serving both a lower level and a higher level of a memory hierarchy, and detecting an early miss in the higher level by means of a present bit without having to execute a compare operation; and/or implementing a single directory serving both a lower level and a higher level of a memory hierarchy, and detecting an early miss in the lower level of the memory hierarchy by means of the addition of a present bit without having to execute a compare operation.

In still another aspect of the present invention a computer system is provided. The system having three level memory hierarchy comprising: a single combined directory used to serve each of the separate storage arrays. Each of the storage arrays serves a respective level of the three level memory hierarchy wherein the organization of the various levels is not compromised by the use of the single combined directory.

In an embodiment of the computer system, the single storage array is comprised of a plurality of islands, each of the islands including a first number of blocks equal to a second number of blocks identified in each of the islands such that any access to the first level memory hierarchy requires accessing data only out of one of the islands of the single combined storage array.

In still another aspect of the present invention a computer memory system is provided. The computer memory system has a hierarchy comprising: an (L1) cache a processor, being capable of delivering at least a logical word or words needed by processor for an L1 HIT; and an L2 cache including a combined L1/L2 directory and a data array in which the L1/L2 directory is accessed upon a MISS to the L1 cache, the L1/L2 directory performing required address translation and, upon a HIT, starts access to the array for a specific block required for reloading into the L1 cache, and upon a MISS, the L2 cache requests a block reload from another level of the hierarchy.

In an embodiment of the computer memory system, the L1 cache consists of a set-associative, late-select cache, the L2 cache consists of a sequential directory-array access organization, the L1/L2 directory and the array being set-associatively mapped for the L1/L2 directory; and/or an L2 cache directory access starts on a cycle in which an L1 access starts, with the L1/L2 directory having capability to perform a translation as required.

In still another aspect of the present invention a method is provided for combining a pseudo first cache directory (L1)

and a pseudo second cache directory (L2) into a combined directory L1/L2, the method comprising: providing a first set-associativity level of the first cache directory; providing a second set-associativity level of the second cache directory; assigning a third set-associativity level of the combined directory to be equal to the second set-associativity level; and forming the combined directory to have the third set-associativity level and a set of representative bits representing the first cache directory.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

Figure 1:
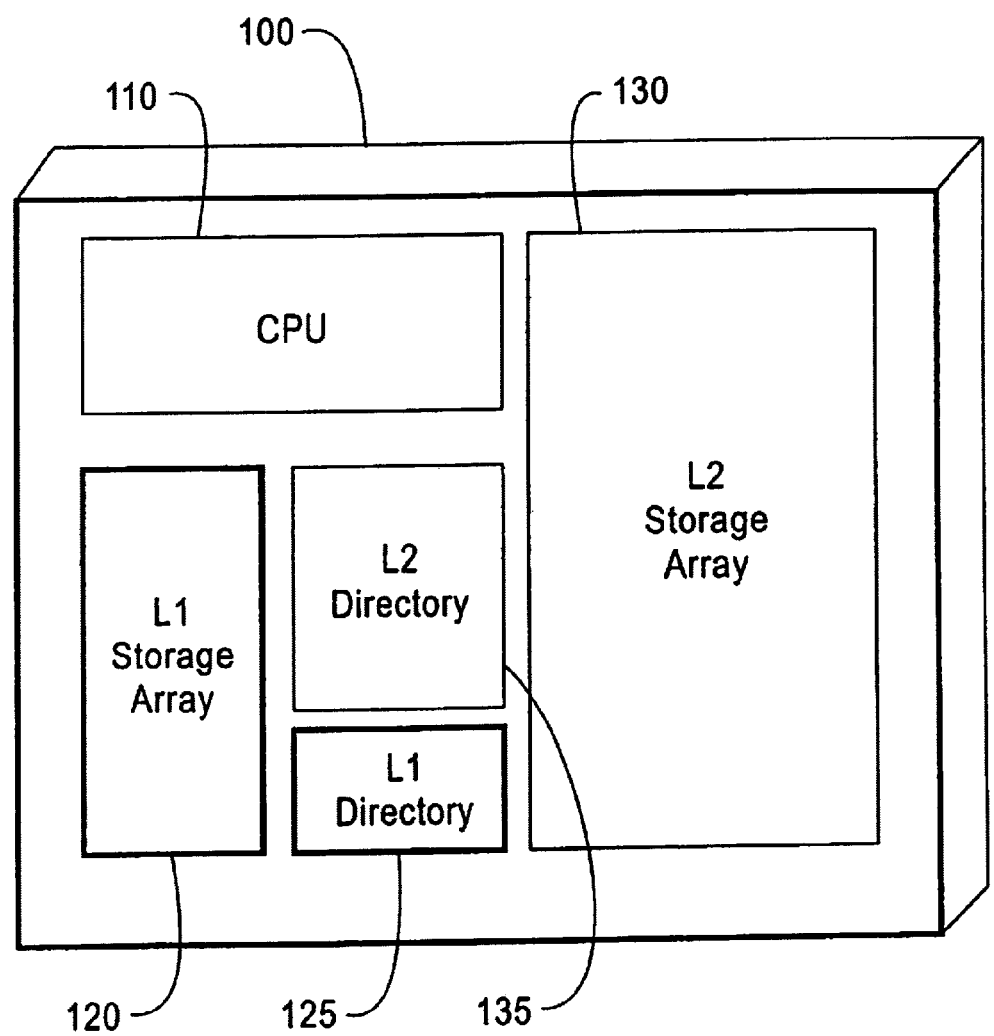
FIG. 1 shows a processor with its cache, L1, and the next higher level which serves it, namely L2, implemented as a separate L1 directory and a separate L2 directory as well as storage arrays used for each level.
Figure 2:
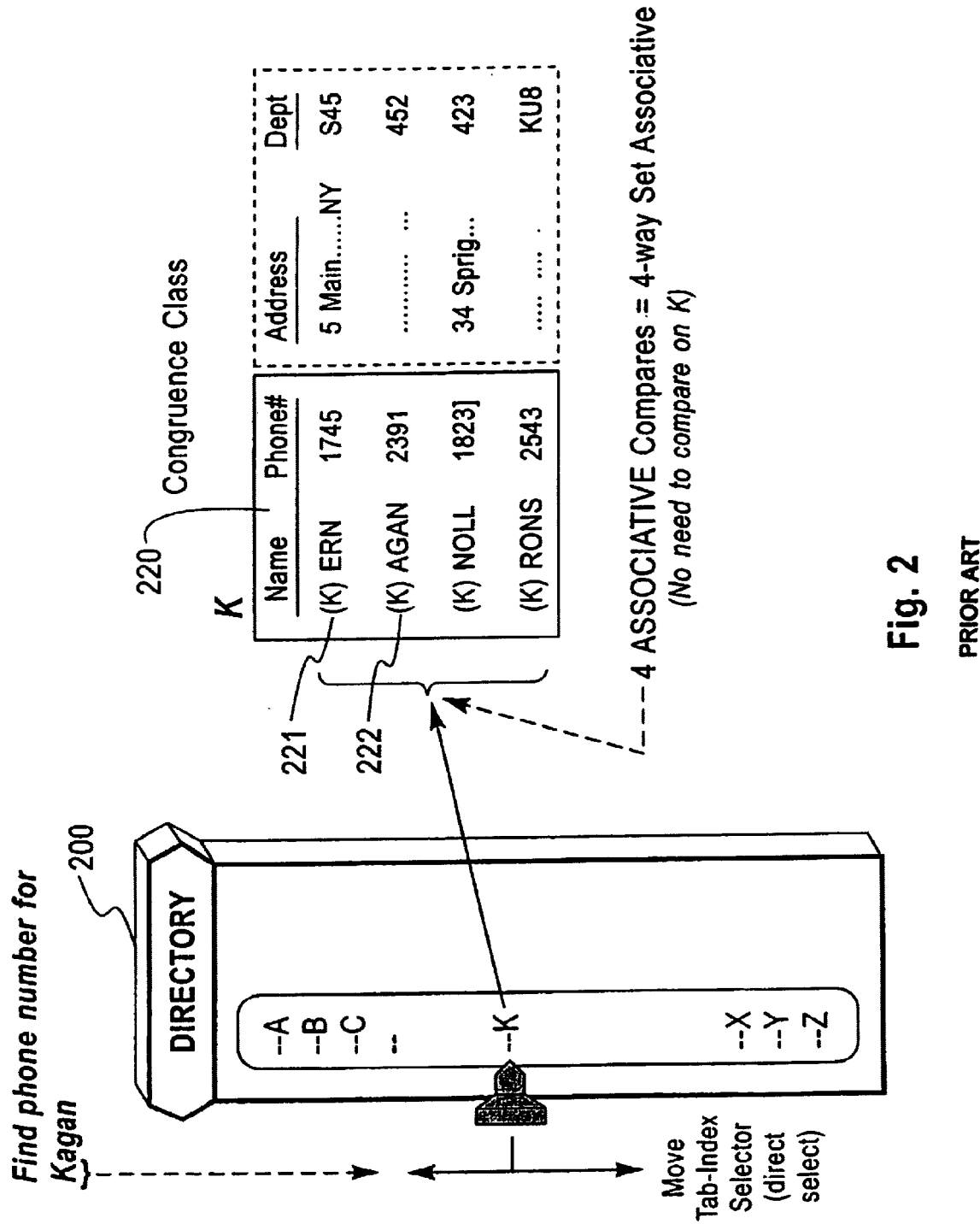
FIG. 2 shows a tab-indexed phone directory.
Figure 3A:
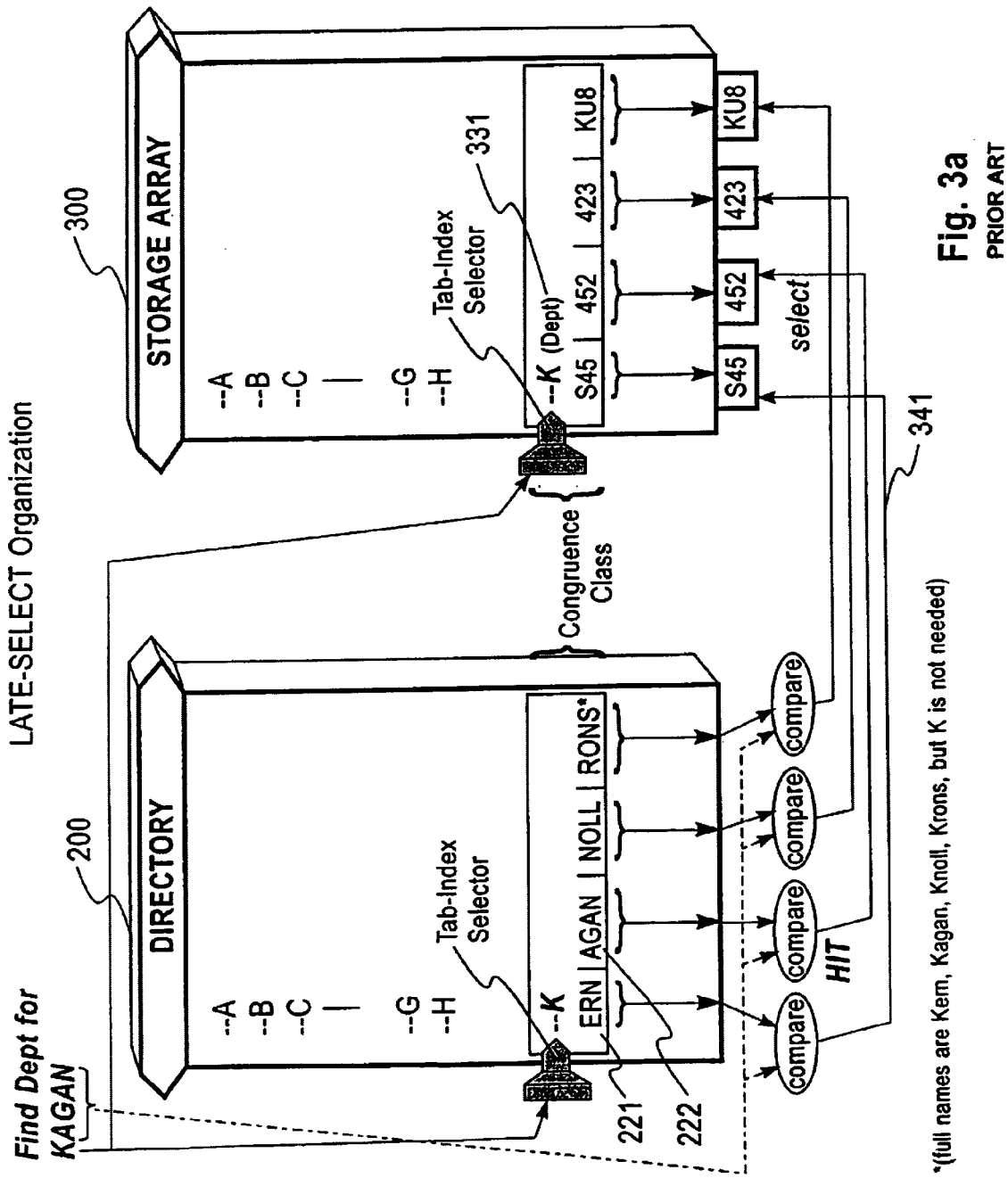
FIGS. 3(a) and 3(b) shows an analogy to an actual late-select organization obtained using two tab-indexed directories.
Figure 3B:
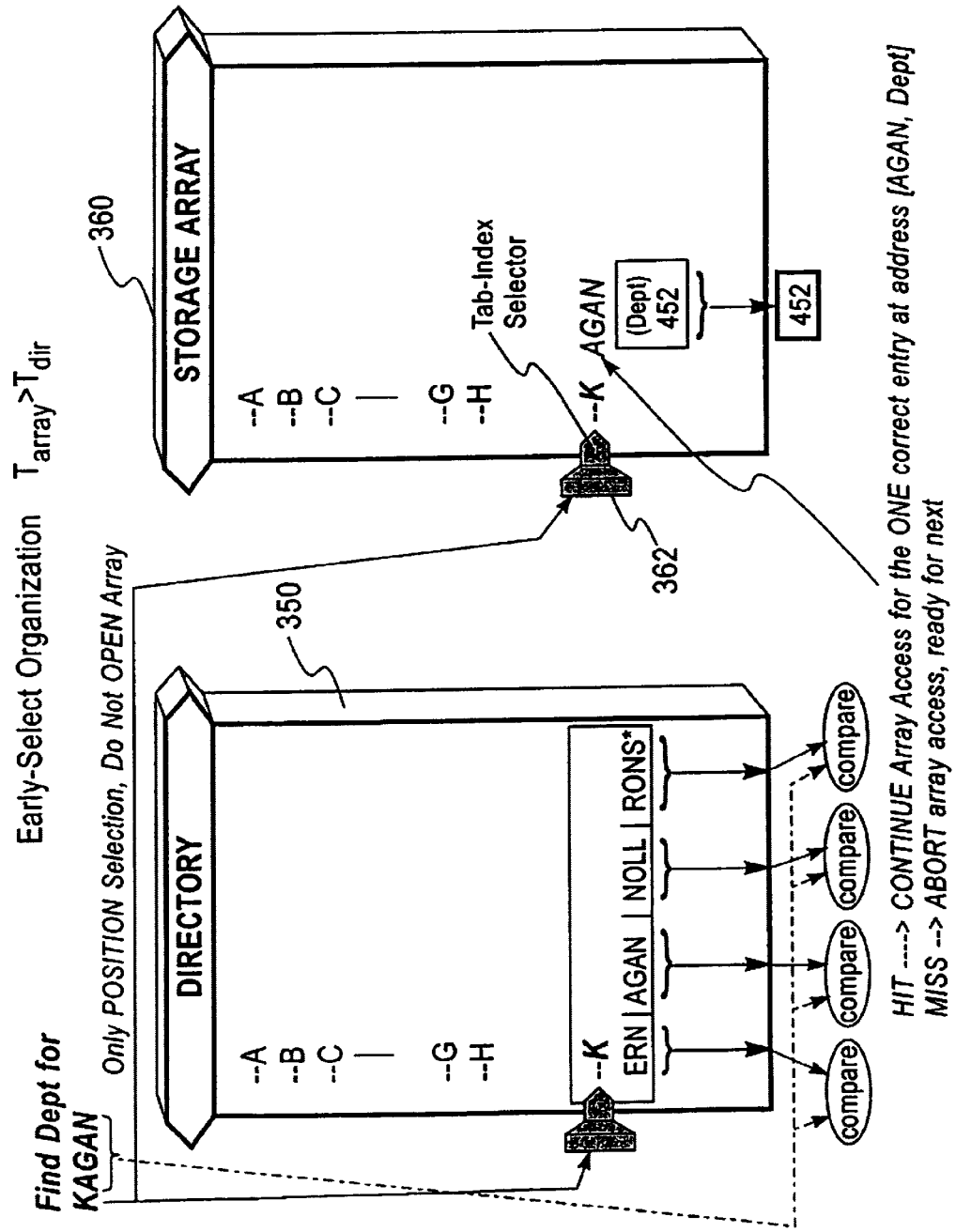

This invention combines multiple directories (e.g. L1 and L2 directory) into a single directory, herein referred to as the L1/L2 directory. This is accomplished while still allowing the individual cache levels to each use its own organization which is best for overall performance. Such a combination is quite advantageous. It is shown that with some small additions to the normal L2 directory, it can be used simultaneously to perform both the L1 and L2 directory functions and has some advantages as are shown. An interesting result is that the LOGICAL set-associativity of the L1 level can be varied, while the number of separate Virtual Address compares actually performed remains fixed at the set-associativity of the L2 level. For instance, if the LOGICAL organization of the L1 is, say 8 way set-associative and the L2 is 2 way, then only 2 compares, on two virtual addresses are required for any L1 or L2 translation via the combined directory. The tradeoff is that for a very large set-associativity ratio of L1 to L2, the size of the combined L1/L2 directory can become as large or even larger than the two directories would normally be if not combined. However, the additional size need not slow the L1 cache down, since it is only necessary to access a small portion (island) of the combined directory for a normal translation. The larger size is often a reasonable price to pay for increased set-associativity in some cases. For cases where the set-associativity ratio of L1/ L2 is not large, the combined directory is generally smaller, as shown subsequently.

For typical memory hierarchies containing an L1 and L2 level, the invention implements such a system with one combined directory which has only one set of access decoders and one set of Compare circuits for performing both the L1 and L2 translation functions. This eliminates the L1 directory and uses a modified L2 directory for both the L1 and L2 accesses. It is realized that in order to access the L1 cache, the larger combined L1/L2) directory must be accessed. Since this directory is several times larger than a standard L1 directory, it initially appears that this must necessarily be slower. However, it is noted that for the crucial part of an L1 cache access, namely a HIT or MISS determination, this need not be slower. This is because only a small subset (island), approximately equivalent to the normal L1 directory, has to be accessed. This access can be fast. Also, for cases wherein a 1-cycle L1 cache is needed, such as for instance in a late-select L1, then the L1 storage array has to be accessed in one cycle. But this L1 storage array can be many times larger than even the combined directory. Thus if the L1 storage array is accessible in 1 cycle, then the combined L1/L2 directory should likewise be accessible in less than one cycle. For instance, with an L1 storage array of 128K bytes using 128 byte block size, thus containing 1K blocks, and an L2 of 8 times the L1, the combined L2 directory, using an average of 50 bits per L1/L2 (combined) block entry would require approximately 50 Kbytes. If this 128K byte L1 storage array can be accessed in one cycle, surely the 50K byte combined L1/L2 directory also can be accessed in one cycle.

In cases where a 1 cycle combined directory is not possible, then a 2 cycle, pipelined directory can be used. This is described in referenced related application, Ser. No. 08/888,730. This is generally not attractive for high performance systems. The additional features needed to make the normal L2 directory serve also as an L1 directory are independent of the number of cycles of access. Therefore, although a necessary consideration in some cases, directory access time does not appear in the subsequent discussions. For simplicity, the invention is described in terms of a 1-cycle combined L1/L2 directory. It is noted that 'early select' is not necessary for the combined directory implementation, but serves as a potential additional improvement.

Now consider the implementation requirements of an L1/L2 directory serving as combined L1/L2 directory. The essential ideas for a combined L1/L2 directory include the following considerations. We start with a normal L2 directory, assuming some set-associativity, say 2 way. Each entry in this directory points to some block in the L2 storage array. A certain number of additional bits are added to each such entry to provide needed information about the location and state of this entry in the pseudo L1 directory. The L1 directory is referred to as a "pseudo L1 directory", because it in fact does not exist. Its function is included in the L1/L2 directory in accordance with the present invention. The L1 set-associativity is an extremely important parameter and identification of the set is crucial. This capability must be preserved within the combined L1/L2 directory.

Figure 4:
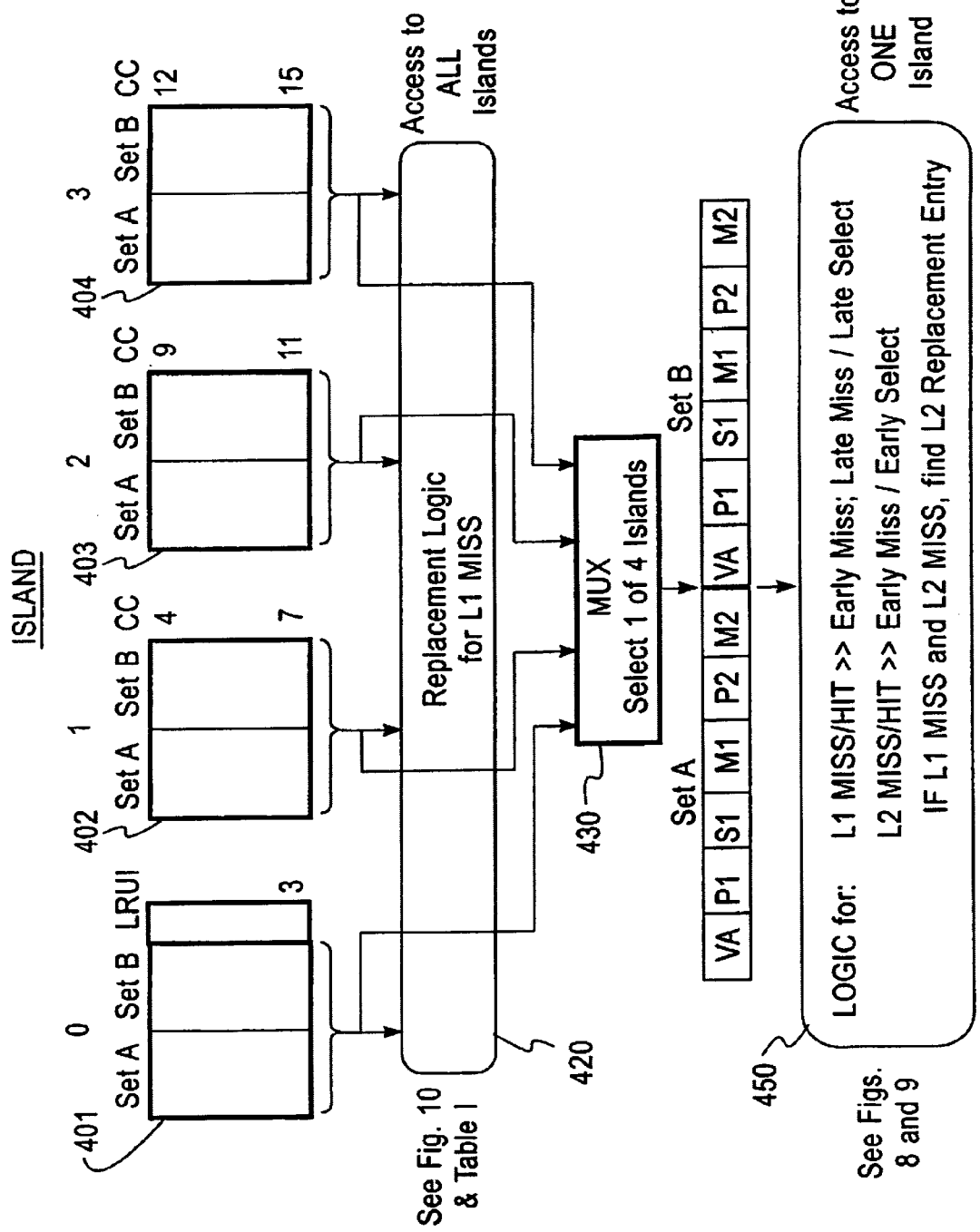
FIG. 4 shows an example overview of combined L1/L2 functions and where performed in accordance with the present invention.

Fundamentally, this combined directory L1/L2 includes a number of subsets of the original L1 directory which can be organized individually as array islands 401–404 as illustrated at the top of FIG. 4. The reason for this is as follows. For set-associative mappings having the same or different set-associativity in L1 and L2, there exists a well defined relationship between blocks residing in L1 and the location where each block can come from in L2. As a result, an access to L1 requires only a small portion, namely an island, of the combined L1/L2 cache directory array to be searched for a Hit or Miss as illustrated at the bottom of FIG. 4. Appropriate bits from the given Virtual Address VA allow the MUX 430 to select the correct island as indicated.

Whenever a Miss occurs (which is infrequent), only then must the full L1/L2 directory (all islands) be interrogated in order to find an L1 block to be replaced as indicated by the Replacement Logic box 420 in FIG. 4. However, this latter interrogation does NOT require any compares on the stored Virtual or Effective address. Rather, only a few bits must be inspected on each island of the L1/L2 directory. The details of the directory organization, additional bits, and their use for a hit and miss/reload, is first described in terms of a simple memory hierarchy.

Consider a first case for a combined L1/L2 directory for simple memory hierarchy shown in FIG. 5(*a*). This system is assumed to consist of an L1 cache 510 using a 2-way Set-associative Directory, and having a capacity of 8 Blocks and thus 4 congruence classes 0–3. The L2 cache 530 is likewise assumed to be 2-way Set-associative, but with a total capacity of 32 blocks, which is equal to 4 times that of L1 cache 510. Thus L2 530 has 16 congruence classes 0–15 as indicated in FIG. 5(*a*). A completely analogous case for L1 having 4-way set-associativity is shown in FIG. 5(*b*). For purposes of illustrating the various signals which can be generated for accessing the corresponding L1 and L2 arrays, it is assumed that the L1 is a late-select organization and the L2 is organized as a so-called Early-Select (Select/Abort) cache of the type described earlier. It should be understood that the basic concepts for the Combined L1/L2 directory are independent of how the array is interfaced to the directory. This can be late-select, sequential, early-select, or other.

In order to understand the mapping and set-associativity problem in a combined directory, we start with separate virtual or pseudo directories. Assume an empty virtual L1 510 and virtual L2 530 and start accessing blocks which fall into one congruence class of L1 510. The blocks which are reloaded into L2 and L1 are those shown in the list "RELOADED Blocks" in FIGS. 5(*a*) 540 and 5(*b*) 590. The corresponding positions of these blocks in the Linear (Virtual) address space are illustrated in the middle portion labeled Linear BLOCK 520 570. The corresponding position of these blocks in the L1 Linear space and their 2-way set-associative directory are illustrated on the left side of FIG. 5(*a*) 515 and similarly for the L2 linear space and 2-way set-associative directory on the right side 535. The corresponding mapping for a 4-way L1 is shown in FIG. 5(*b*) 565 585. After some unspecified time of operation, wherein the cold start has completed, the L1 and L2 caches have some distribution of cache blocks. However, no matter how many or which Virtual blocks are reloaded into L1 and L2, there are certain restrictions on where these reside in the L1 and L2 directories as well as the mapping between blocks in L1 and L2 directories. For instance, any of the Virtual blocks in list "RELOADED Blocks" 540 of FIG. 5(*a*) will, in fact usually must, reside only in congruence class 3 512 of L1 510. These same blocks can reside in either of the four Congruence classes CC3 531, CC7 532, CC11 533, or CC15 534 of the L2 directory 530 since L2 530 is 4 times larger than L1 510 and has the same set-associativity.

As shown in FIG. 6, at any given moment, any 2 of these RELOADED blocks 530 present in the L1 directory 510 can be ANY 2 of the 8 blocks from any of these 4 L2 congruence classes 531–534, in any combination. However, any given VA can reside only in one of the L2 congruence classes. This one is specified by the lower order address bits b4 602 and b5 603 shown in FIG. 6(*a*).

The similar case for L1 having 4-way set-associativity while L2 remains 2-way, is shown in FIGS. 5(*b*) and 6(*b*). Since the set-associativity of L1 is twice that of the previous case, there are twice as many places in L2 580 which can map to any given congruence class in L1 560. For instance, the "RELOADED Blocks" 590 are now assumed to have linear virtual addresses so as to fall ONLY in CC1 561 of L1 560, as shown. This now produces twice as many places in L2 580 which can map to CC1 561 of L1 560.

Thus, for accessing the pseudo L1 directory for a HIT/MISS, the L1/L2 (combined) directory must be logically partitioned into 8 islands, twice the previous number. Only one of the 8 islands is accessed for a normal L1 directory interrogation, and all 8 islands are accessed to find an L1 replacement when an L1 Miss occurs. This is discussed fully later and the number of islands needed is shown to be given by equation (2). Except for the number of islands needed, the details of operation are the same for all cases, with only some circuits being replicated as necessary in order to accommodate the larger number of islands. The details are discussed in terms of L1 and L2 having 2-way set-associativity, for simplicity. Fundamentally, we start with an L2 directory such as that in FIG. 6(a). To achieve a combined directory, L1/L2, we include other bits in each entry to give the necessary L2 to L1 set mapping, and other needed functions, as follows.

Figure 6A:
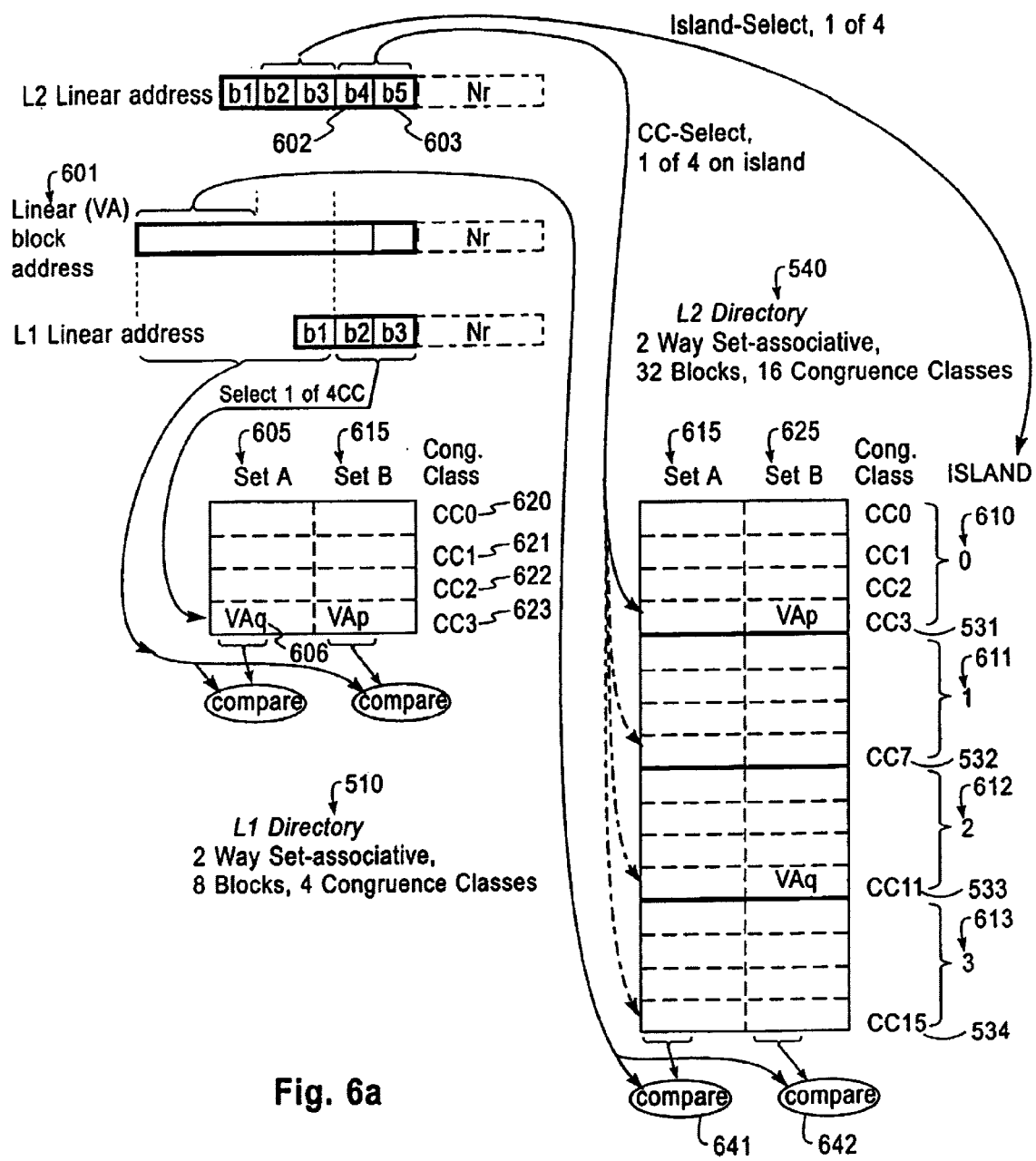
FIG. 6(a) shows an example embodiment of the present invention mapping L1 sets A and B for 2-way set-associativity.
Figure 6B:
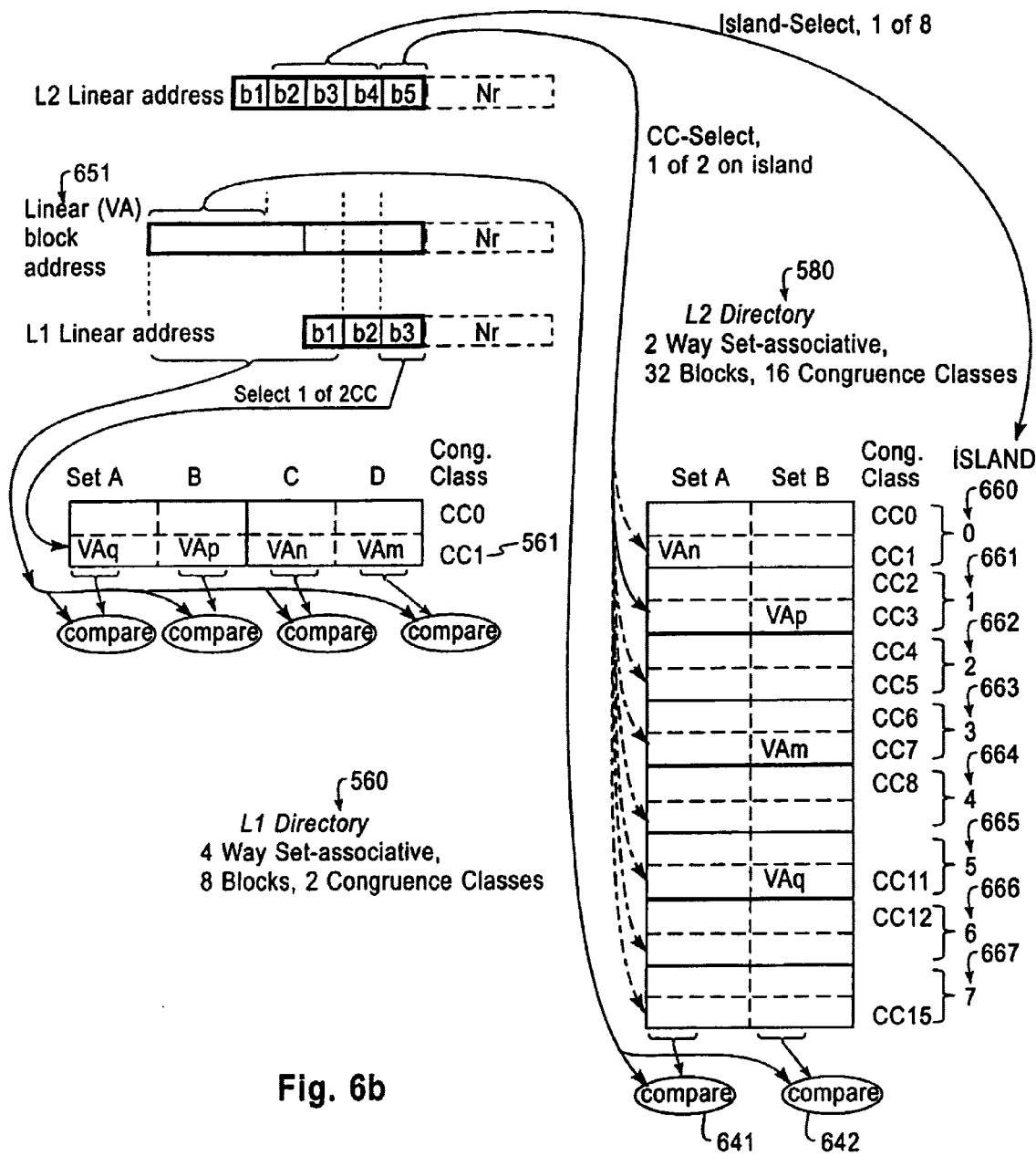
FIG. 6(b) shows an example embodiment of the present invention mapping L1 sets A, B, C, and D for 4-way set-associativity.
Figure 7:
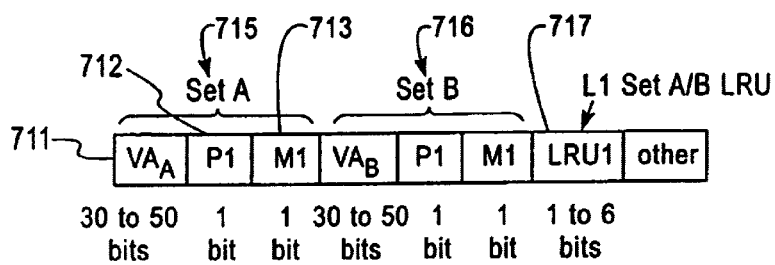
FIG. 7 shows directory bit identification for separate L1, L2 directories and for a combined L1/L2 directory in accordance with the present invention.
Figure 7:
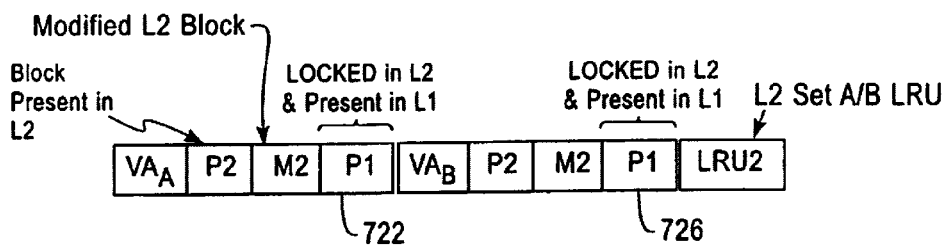
Figure 7:
Figure 7:
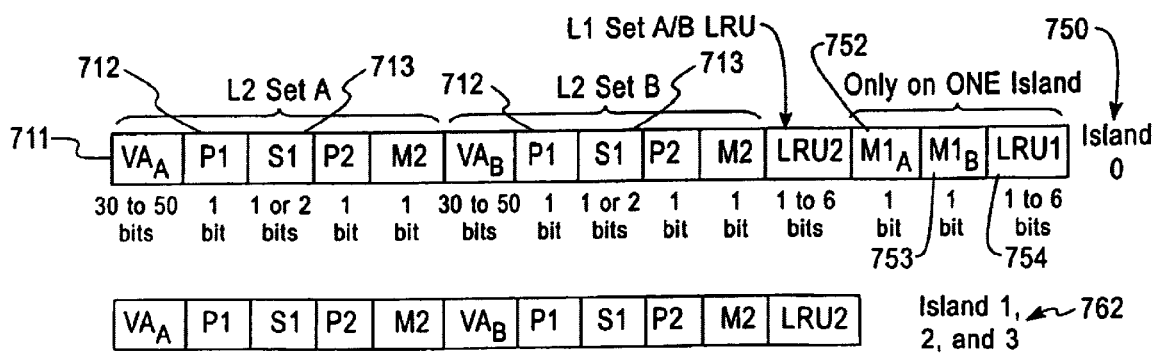

In a typical L1 directory (separate, uncombined) each congruence class as a minimum has the bits shown in FIG. 7, for case (i) 710. The VA bits 711 are the part of the Virtual (Linear) address which must be compared as indicated in FIG. 6(a) 601 and 6(b) 651. The Present (or Valid) bit, P1, 712 indicates that the entry is usable, and the Modified bit, M1, 713 specifies if this block has been modified since it was last reloaded. If it was modified, then this block must be written back from the L1 array to the L2 array before it can be replaced. This latter operation is essential for a so called "store-in" cache. Additional bits may or may not be needed for other functions which we neglect. For a two way set-associative organization, there are two groups of these bits for each congruence class, one for each Block or set of the congruence class, Set A 715 and Set B 716 as shown. In addition, the congruence class has an LRU bit field 717 which specifies which of the sets is Least Recently Used. For two way set-associativity, this is a one-bit field, and 6bits for 4-way set-associativity. In general, the LRU bits required are $$(SA)*(SA-1)/2$$

where SA is the set-associativity.

A separate L2 directory for a unprocessed would have similar bits fields in its directory, but more congruence classes. These bits, for one congruence class, are shown in FIG. 7, for cases (ii) 720 and (iii) 730 for an inclusive and non-inclusive L1/L2 respectively. The main difference is that an inclusive cache directory must have the P1 bit 726 in the L2 directory as shown in FIG. 7(ii). This bit indicates that this block is Present in L2, and therefore Locked in L1. This indicates that it cannot be removed from L2 until it is first castout or unlocked by L1. The non-inclusive directory 730 does not need such a bit. In this case, any block in L2 can be castout whether it is present in L1 or not.

For a single, combined L1/L2 directory, we start with an L2 directory and add sufficient bits to make it serve also as an L1 directory. Each directory entry for the combined, inclusive case requires as a minimum the particular bits shown in FIG. 7, case (iv) 740. The VA 741 and 746 serves both the L1 and L2 directories. We must preserve the M1 and P1 bits, as well as the M2 and P2 bits. The P1 bits 742, 747, serve both as the L1 "Present" and "Locked in L2" bits, as represented by bits 722 and 726 of FIG. 7, case (ii) 720. The M1 bits 752, 753, as described above, indicate whether a block has been modified in L1. We ONLY need one M1 bit per L1 block. So rather than maintaining one such bit field with each L2 entry, we can store this bit analogous and adjacent to the LRU1 754 bits as shown, on one island 750. If we stored the L1 cache MRU1 and M1 bits for each congruence class of the L2 directory, then the combined directory would be excessively large. So the L1 MRU1 and M1 bits are stored only on one island, for instance Island 0 750 as shown in FIG. 7, case (iv) 740.

In addition, each L2 block entry must have a Set Identification bit, S1, 743 and 748 as illustrated, for the following reason. As shown previously, any given Congruence class in the L1 directory can have ANY 2 of the 8 possible blocks from the 4 corresponding Congruence classes of L2. As indicated in FIG. 6(a), the blocks VAp 621 and VAq 622, both from Set B of the L2 directory are located in Set A and B respectively, of the pseudo-L1 directory. Thus a block in Set A 605 of L1 510 can come from Set A 615 or Set B 625 of L2, or likewise for a block in Set B 615 of L1. As a result, the combined directory, L1/L2, must be able to map a block in any set of L2 to any set of L1. This is done with an L1 Set bit, S1 for Set A 743 and for Set B 748. Each entry in the combined directory 740 has a separate S1 bit which is appropriately updated when the L1 cache and directory are updated with a new block. This is a 1 bit field for 2-way, 2 bits for 4-way set-associative cache organizations etc. We must know the Set of the block in L1 so that for instance the correct Late-Select signal (or other) can be generated for accessing the storage array as shown previously.

Now we consider combined L1/L2 islands. The combined L2 directory 540 of FIG. 6(a) is broken into LOGICAL islands 610–613 as indicated, with each island containing one of the 4 possible Congruence classes which can map to the chosen L1 congruence class. In this way, each island is analogous to the L1 directory, specific to each of the 4 groups of L2 congruence classes. Each logical island contains the only possible location of any specified Linear VA block address. Thus if the given access is to VAq 606 located in Congruence class 3 623 of L1 510, this block can only reside in congruence class 11 533 of L2. Thus it is necessary to only interrogate logical island 2 612 of the L1/L2 directory 540 of FIG. 6(a) (i.e. island 2 403 of FIG. 4), and do a compare of the remaining (unused) Linear VA bits on the corresponding linear block bits stored in the directory. This is illustrated more fully in FIG. 6(a). In this case, one congruence class from one island (e.g. CC11 533 from L2 Island 2 612) containing both L2 Sets A 615 and Set B 625 of this entry, is accessed by way of the Multiplexor, MUX (430 in FIG. 4).

It is noted that in alternate embodiments this selection of the particular congruence class and island are done in other ways. The logic performed on this selection only determines if a HIT or MISS is obtained in L1 and/or L2. The possible outcomes for L1 are: an Early Miss is obtained, or an Early Miss is not obtained. If an Early Miss is not obtained then use Late Miss or Late-select (assuming a late-select L1). The possible outcomes for L2 are an Early Miss is obtained, or an Early Miss is not obtained. If an Early Miss is not obtained then use Early Select/Abort (assuming an Early-Select L2 organization). The details of this logic are shown in FIG. 8 for the Early Miss determination in L1 and L2, and the remaining logic in FIG. 9.

Figure 8:
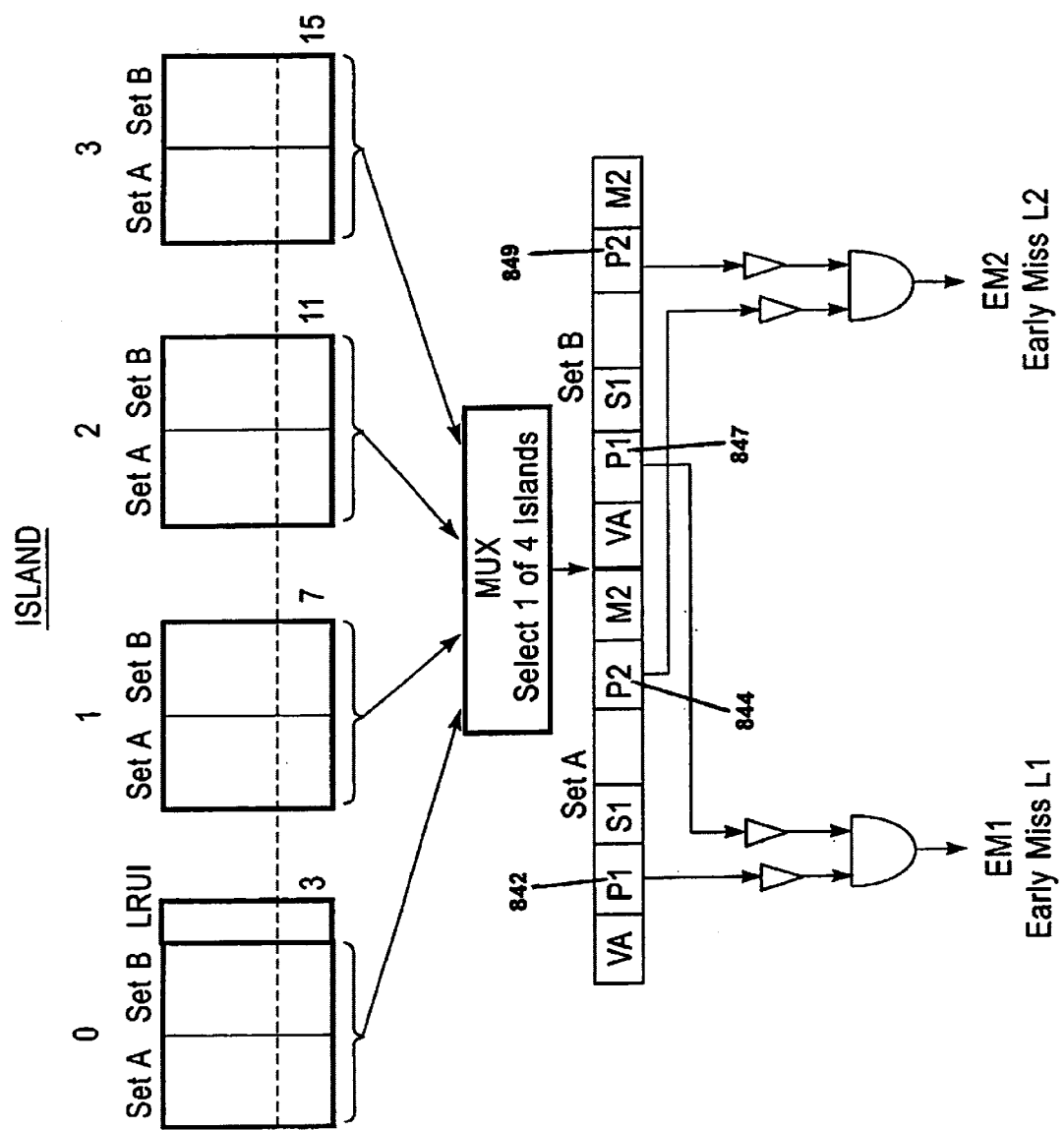
FIG. 8 shows early MISS logic for L1/L2 in accordance with the present invention.
Figure 9A:
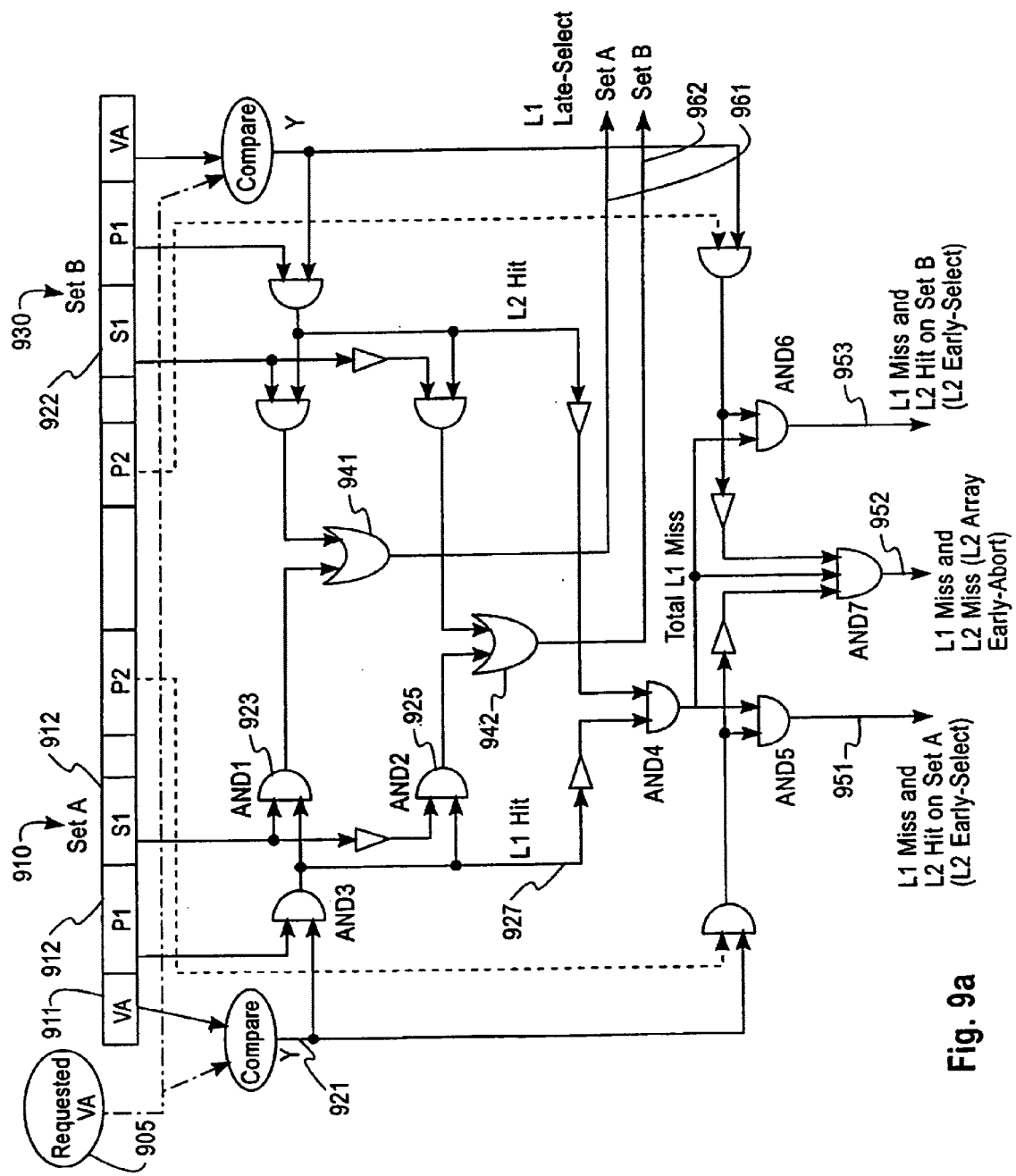
FIG. 9(a) shows HIT/MISS logic for L1/L2 in accordance with the present invention.

Now, we consider an example embodiment of an Early MISS as shown in FIG. 8. Recall from FIGS. 5(a) and 6(a) that at any moment in time, any given congruence class in L1 510 can have blocks from any 4 congruence classes in L2 530. However, any specific, accessed Linear VA 520 can come from only 1 specific congruence class of L2 530. If neither of the blocks in the selected congruence class of L2 530 happen to be in L1 510 (even though this L1 congruence class might have 2 blocks from other L2 congruence classes) we can get an EARLY MISS indication as follows. The P1 bit in each of the sets A 842 and B 847 of L1/L2 FIG. 8, indicate if this particular L2 block is currently present in L1 510. If P1 from Set A 842 and P1 from Set B 847 are both 0, then the desired block cannot possibly be in L1 510. Hence we get an EARLY Miss signal, even before the Compares are performed on the stored VA bits. In an analogous fashion, an EARLY Miss signal for L2 530 can be obtained by again testing the P2 bits for Set A 844 and B 849 of FIG. 8, before any Compares are performed. If the Early Miss on L1 is false when at least one of the 2 possible L2 blocks is in L1, then the Compare logic of FIG. 9(a) is performed. This is described below.

Now, we consider an example of HIT/MISS Compare Logic by referring to FIG. 9(a). The identical logic is done for each of the 2 sets, Set A 910 and Set B 930 of L2, and finally combined to get the full result 951–953 961,962. The VA 911 stored in Set A of L1/L2 is compared with the input VA 905. If the compare is TRUE, indicated by the COMPARE Y output 921 signal equal to 1, and if the P1 912 bit is 1, then a Hit 927 is obtained. However, we do not know if this block in Set A of L2 belongs to Set A 605 or Set B 615 of L1 in FIG. 6a. This is specified by the L1 Set bit, S1 913. If S1=1, this corresponds to Set A 605 of FIG. 6(a) of L1, while S1=0 corresponds to Set B 615 of FIG. 6(a) of L1. Assume for Set A of 910 L2 that the compare is TRUE so Y=1, and P1=1, 912, S1 =0, 913. This would cause the output of AND1 923 to be 0 but AND2 925 to be 1 where the latter supplies the Late-Select signal for Set B of the L1 Array (assuming a late-select L1 organization). If the above S1 bt 913 were a 1 instead of 0, the output of AND2 925 would be 0 but AND1 923 would be 1, where AND1 923 supplies the late select signal 961 for Set A 605 of the L1 Array in FIG. 6(a).

A similar type of logic is performed for an L2 Hit/Miss on Set A (not shown), In this case, the output of the compare is combined with the L2 block present bit, P2 (similar to that done above for L1) but only if the P1 bit is 0 (not present in L1). We cannot have a miss in L1 if it is present in L1. One difference for the L2 Hit/Miss logic is that the L2 set is defined by the position in the directory, the current set being set A. The signal which we finally obtain for the L2 Hit or Miss is an Early- Select/Abort signal to the L2 array, analogous to the late-select signal to the L1 array.

As indicated in FIG. 9(a), the same, identical logic functions are performed on the bits stored in the L1/L2 Set B 930 entry. The two L1 Late-select signals for Set A 605 of FIG. 6(a) must be ORed 941 together for the final one late-select signal 962. Likewise the two L1 Late-select signals for Set B, 615 of FIG. 6(a) are ORed 945 to obtain one L1 late-select signal 962 for Set B. If a Miss is obtained in L1 for both Set A and B of L2, then these two separate signals must be ANDed together via AND4 to give the Late MISS L1 signal as shown.

At the same time, on each directory access, the L2 Early Select 951, 953, Abort 952 signals are generated. If L1 has a total Miss in both L2 sets, Set A 910 and Set B 930, and if L2 has a Hit in its Set A or B, then the L2 Early- Select Set A 951 or Set B 953 is given by the output of AND5 or AND6 respectively. If L2 has a Miss simultaneous with an L1 Miss, the L2 Early-Abort signal 952 to the array is given by the output of AND7.

It should be noted that in all the HIT/MISS logic, we could change the logic in various ways. For example, the Compares may ONLY be done if the appropriate P bit is a 1 etc. Likewise, various other logic could be performed differently. This is a circuit design tradeoff, independent of the concepts of the present invention for combining the L1/L2 directory.

Now, we consider the example embodiment for the MISS Replacement Logic. The L1 and L2 storage arrays are separate physical as well as logical structures. Thus any miss in L1 requires a reload of the required block (data or instructions) into the L1 array. It is assumed that either a Hit occurs in L2 for this block, or the L2 reload is performed as describe later. The logic of an L1 Miss replacement is fundamentally the same for any associativity, but requires slightly more logic for set-associativity greater than 2.

The process for the general case is first specified, followed by more detailed logic for the simple example of 2-way Set-associativity. In all cases, an example of a basic strategy for finding an L1 replacement block is as follows. Using the MRU1 bit field on Island 0, identify the LRU set ID. Then search all corresponding Congruence Classes on ALL islands, find this LRU entry and set its P1 bit to 0. Next, in the directory entry which had the L2 Hit, set its P1 bit to 1, and S1 bit to the ID of the set replaced in L1. Update the LRUL bit field of Island 0 so that this S1 ID is now the Most Recently Use (MRU) block.

Figure 9B:
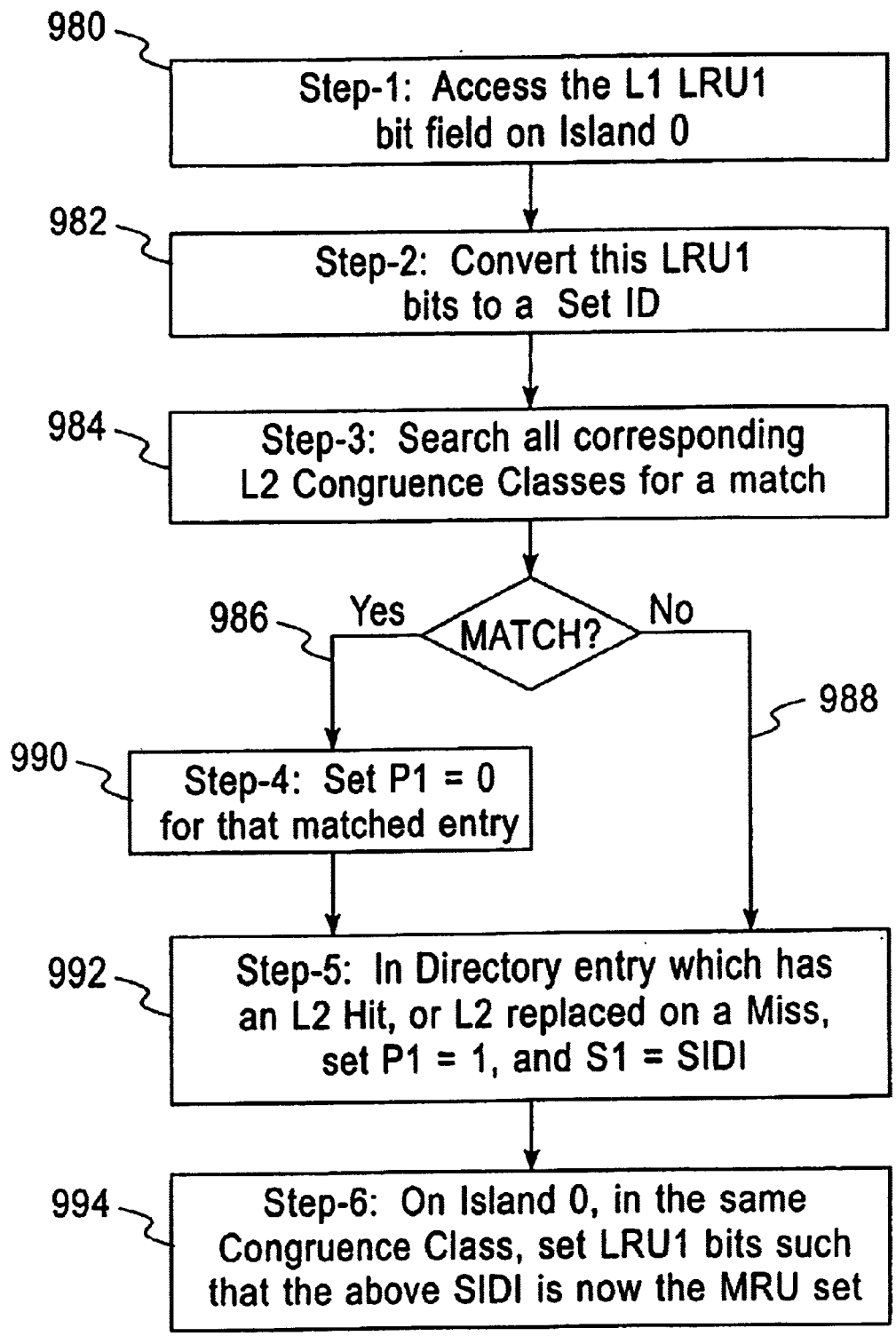
FIG. 9(b) shows an example flow diagram of the steps used for L1 REPLACEMENT for a general case of a combined directory L1/L2, in accordance with the present invention.

FIG. 9(b) shows an example flow diagram of the steps used for L1 REPLACEMENT for a general case of Combined Directory L1/L2. It shows the following steps:

Step-1: 980 Access the L1 LRU1 bit field on Island 0 (or wherever stored) for the given congruence class;

Step-2: 982 Convert this MRU1 bits (or LRUL in combination with M1 bits, if necessary) to a Set ID, SID1, of the directory entry to be replaced.

Step-3: 984 Search all corresponding L2 Congruence Classes (all islands) for a match (P1=1) and (S1=SID1).

IF a match is found in step-3, 986 THEN go to step 4:

Step-4: 990 Set P1=0 for that matched entry

Step-5: 992 In Directory entry which has an L2 Hit, or L2 replaced on a N4iss, set P1=1, and S1=SID1

Step-6: 994 On Island 0, in the same (corresponding) Congruence Class, set LRU1 bits such that the above SID1 is now the MRU (Most Recently Used) set. With 4-way associativity, this requires setting only 3 of the pair bits, the remaining 3 pair bits and thus the remaining order are not changed. ELSE IF no match is found in step-3, 988 THEN go directly to Step-5 992 and Step-6 994.

It is noted that for 2-way set-associativity, these steps becomes quite simple since the SID1 bit is immediately given by the LRU1 bit, and setting NMU requires only the inversion of the LRU bit.

Figure 10:
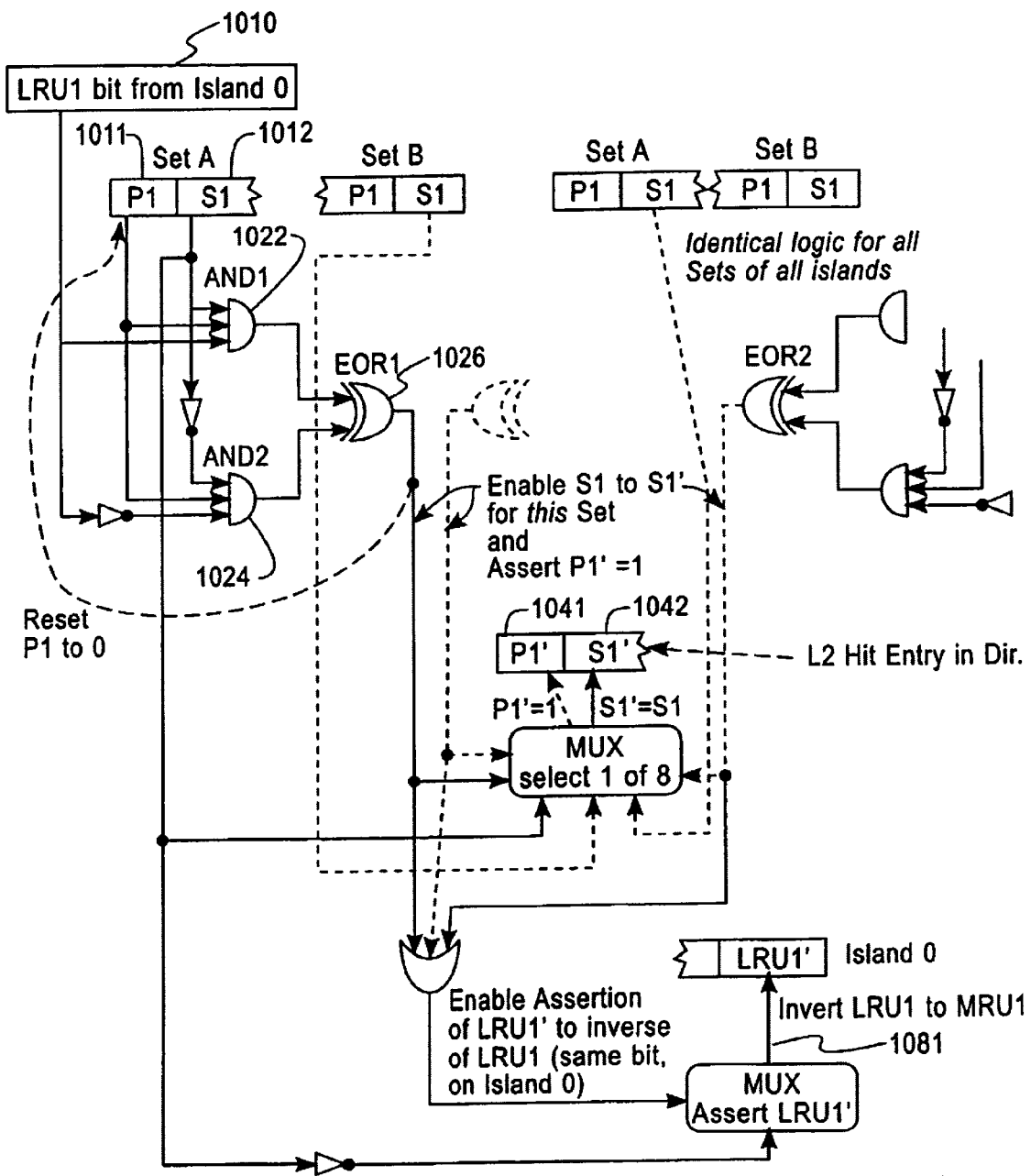
FIG. 10 shows the updating of the combined directory on an L1 miss early MISS logic for L1/L2 for the 2-way set-associativity assumed for a simple case, in accordance with the present invention.

Now, consider an L1 MISS with L2 HIT for the Case of 2-way set-associativity. For the 2-way set-associativity assumed for a simple case, the updating of the combined directory is accomplished on an L1 miss as shown in FIG. 10. When a miss occurs in L1, it is necessary to first find an empty space or block to replace in the correct congruence class of L1. As indicated previously with respect to FIG. 5(a) and 6(a), any block in L1 510 can come from any of 8 blocks in L2 530. So for completing the full replacement logic, we have to look in all possible places. For the particular example chosen, namely congruence class 3 512 of L1 510, we have to look in the 4 corresponding congruence classes of L2 530, namely CC3, CC7, CC11, and CC15 531–534, to find the 2 possible blocks which could be present in L1 510, and determine which one to replace. This requires access to all 4 islands in FIG. 4 and 6(a) for the entries from all 4 congruence classes. We could have done this access on the initial access for a Hit/Miss, and latched the data for this purpose, or do another L2 directory access. The latter is very undesirable since it adds another cycle to the reload time.

The access to all 4 islands of L2 is illustrated by the mid portion of FIG. 4. The Replacement logic is detailed in FIG. 10 and proceeds as follows. If ONLY the LRU (Least-Recently -Used) bit (no M or other bit) is used for the replacement policy in L1, then the LRU1 bit on Island 0 1010 always specifies the Set of L1 to be replaced, regardless of whether 0, 1 or both blocks are present in the L1 directory.

It is noted that in an embodiment wherein the L1 cache uses a Store-In policy (i.e. modified L1 blocks are not written back to L2 until they are replaced), then the replacement process might additionally include the Modified bit, M and /or others. In such a process, an unmodified block is a higher priority candidate for replacement than a Modified block. This is standard state of the art and is not included in the logic shown in FIG. 10. This is a design alternative, determined by many other consideration, and does not affect the fundamental operation of the concept of the present invention. we ignore the M bit and/or other bits for purposes of illustration. These can easily be included if necessary. The M1 bit is nevertheless still included in the combined directory size analysis.

To update the L1 entry, we still must test the P1 and S1 bits of all 8 entries, to locate the one to replace, and then reset its P1=0. The logic for this is shown in the top section of FIG. 10 and is identical for all sets of all islands, as indicated. The Exclusive OR gate, EOR1 1026, generates the enable for the first entry, and likewise, similar EOR gates for the remaining 7 entries. This logic essentially provides step-3 and step-4 of FIG. 9(b).

Referring to FIG. 10, the P1 1011 and S1 1012 bits of each of the 8 entries (4 pairs) are interrogated as follows. If P1=1 then this block is resident in L1 and its S1 bit is then compared with the MRU1 bit (accessed from Island 0) by way of AND1 1022 and AND2 1024. If no P1 bit is 1, then nothing needs to be done at this stage. Assuming an LRU1 match is found in one of the 8 entries, then the output enable of one of the EOR gates will be 1. This will cause the S1 bit which provided the match, to be inserted as the S1 bit, now called 'S1' 1042 for distinction, in the L2 Hit entry of the directory. The corresponding P1 bit, now called P1' 1041 is set to 1. Since a hit occurred in L2, the correct VA will already be in the directory so the directory updating is complete.

Finally, the original LRU1 bit read from Island 0 of this congruence class must be inverted 1081 to make this new block the Most Recently Used, MRU. This corresponds to step-6 994 of FIG. 9(b). The case when no match is found 988 follows in a straight forward manner. The requested block is read from the L2 array and loaded to the L1 array, as usual, and the reload operation is complete.

Now we consider the case when there is an L2 MISS with an L1 Miss. If an L2 Miss occurs at the same time as an L1 Miss it is first necessary to locate the L2 directory entry to be replaced since this is where the P1 912 and S1 913 bits will also be updated. This happens for the case in FIG. 9(a), when output of AND7 952 is equal to 1. Logically, the operation can be thought of as performing the following steps.

Identifying the L2 directory entry to be replaced (1 of 2), and inserting a new VA into this entry and setting P2=1 for the LRU as appropriate. Continue as above for L1 Miss with L2 Hit. Electrically, some of these can be done in parallel. This is strictly implementation dependent. All that is necessary is that an equivalent logic be done in some manner.

Now, we describe a more general case of the combined L1/L2 Directory in accordance with the present invention and herein called the L1/L2 directory. In the simple case, described above, both L1 and L2 were assumed to be 2-way set-associative. It is possible and desirable to allow these to be of different values and even different from each other. For instance, an L1 set-associativity of 4 is often used, and we may have L2 set-associativity of 2 as shown in FIGS. 5(b) and 6(b). These set-associativity values require only minor changes in the above combined directory accessing.

Some fundamental guiding principles for a combined L1/L2 directory L1/L2 are as follows. Regardless of the set-associativity of L1, the number of compares 641 642 necessary, shown in FIG. 6(a) is always equal to the set-associativity of L2. Thus, even if the set-associativity of L1 is 4, 8, or 16, when the L2 set=-associativity is 2 then only 2 compares are required. This can save a substantial amount of time and compare circuitry. This is advantageous in so much that the compare circuitry is often slow and complex when large number of bits are involved as here. However, the number of L1 LRU bits would still be the same as for an uncombined set-associativity, SA, of a 4, 8 or 16 way L1. The number of L1 LRU bits for these set-associativities are 6, 28, or 120 respectively. For LRU replacement policy, the number of LRU bits required is given by:

$$(SA*(SA-1))/2.$$

In this case when replacing an L1 miss, all possible locations of L1 blocks within the combined L1/L2 directory must be accessed in order to perform the replacement logic 420 of FIG. 4. This is equal to the number of places in L2 from which a given block in L1 can come or:

$$\#\text{Places of L2 per L1 Block}=\{NB2*SA1\}/NB1 \quad (1)$$

where, NB1, NB2=total number of blocks in L1 and L2 respectively, and SA1=Set-associativity of L1. For example, for a case having cache sizes of $$NB2/NB1=4 \text{ or } 8,$$

(L2 has 4 or 8 times as many blocks as L1), and a set-associativity of SA1=2, the number of L2 places from which any L1 block can come, according to Equation (1) is 4*2=8, and 8*2=16 respectively.

For a case where the L1 set-associativity is doubled to 4, then the number of L2 places where any L1 block can come from is respectively, 16 and 32. This is also the total number of entries to be accessed and searched for an L1 replacement. For the example shown in FIG. 4 this includes 0–3 401–404. If each Island of the L1/L2 directory is assumed to contain SA2 entries, where SA2 is the set-associativity of L2, then the number of islands to be accessed is given by Equation (1) divided by SA2, such that:

$$\# \text{ Islands} = \#CongClassL2/\#CongClassL1. \quad (2)$$
$$= \{(NB2/SA2)/\{(NB1)/SA1)\}$$
$$= \{NB2/NB1\}*\{SA1/SA2\}.$$

Thus if NB2/NB1=4 and SA1=4, while SA2=2, then Eq (2) requires 8 islands 660–667 to be accessed as in FIG. 6(b), rather than 4 islands 610–613 as in FIG. 6(a). We simply doubled the set-associativity of L1 while holding everything else constant, so as to get twice as many L2 places to which any L1 block can map. This is additionally illustrated 586 in FIG. 5(b).

A fully associative L1 means any block in L1 can come from any location in L2. In some embodiments L1 is made fully associative. If we make L1 fully associative, then NB1=SA1, and Equation (1) indicates we must search all L2 entries for an L1 replacement. Se we must search NB2/SA2 islands if we store SA2 sets per island. This is, of course, reasonable.

Now we will show the net number of directory bits saved by using the combined L1+L2 directory, L1/L2. The theoretical maximum number of bits that can possibly be saved is the size of the L1 directory that is being replaced. This directory is herein referred to as a virtual or pseudo L1 directory. It is virtual in so much that it really doesn't exist since its function is performed in the L1/L2 directory. The actual number of bits saved by implementing the present invention is somewhat less. This depends upon the particular parameters of the directory being considered. The combined L1+L2 directory, L1/L2, eliminates some of the L1 directory bits which would have been necessary in a non-combined case, and likewise adds some bits not previously needed. The NET saving in total number of bits is a function of the several parameters of the two caches. It often depends especially on the ratio of the virtual L2 size to the virtual L1 size, namely NB2/NB1, and the VA bits stored in the virtual L1. We assume "Store- In" caches so all blocks require a modified bit for write-back to the next level, when needed. For a particular embodiment the minimum number of bits per entry for separate L1 710 and L2 720 730 directories, as well as the combined L1/L2 directory 740 is illustrated in FIG. 7.

In the separate, uncombined L1 710, FIG. 7(i) shows that each L1 Block must have a Virtual Address, VA 711, a (valid or) Present bit, P1 712, and a Modified bit, M1 713 stored in the directory. In addition, each Congruence Class must have one set of LRU1 bits 717. The number of congruence classes is the total number of blocks divided by the set-associativity. Thus the total minimum size of a separate, store-in L1 rectory is:

$$NB1*[VA+P1+M1]+[LRU1*(NB1/SA1)]=NB1*[VA+2+(LRU1/SA1)] \quad (3)$$

For the separate, uncombined L2, we assume an embodiment for an inclusive L1/L2 which requires the bits per directory as shown in FIG. 7 (ii) 720. For a Non-Inclusive case, these calculations are modified to reflect the bits per entry as shown in FIG. 7(iii) 730. Thus a separate, inclusive L2 directory should have: a Virtual Address, VA, a valid or Present bit, P2, a Modified bit, M2, and a Locked/Present bit, P1, stored in the directory. In addition, each Congruence Class should have one set of LRU2 bits. As previously noted, the number of congruence classes is the total number of L2 blocks divided by the L2 set-associativity. Thus the total minimum size of a separate, inclusive, store-in L2 directory is given by:

$$NB2*[VA+P2+M2+P1]+[LRU2 * (NB2/SA2)]=NB2*[VA+3+(LRU2/SA2)] \quad (4)$$

Each directory entry for the combined, inclusive case should have the minimum bits shown in FIG. 7 (iv) 740. The VA 711 serves both the L1 and L2 directories. We must preserve the P1 712 and M1 713 bits, as well as the M2 and P2 bits. The P1 712 bits serves both as the "L1 Present" bit, and "Locked in L2" bit of FIG. 7 (ii) 720. Both of these are required for each L2 block entry. However, we ONLY need one M1 913 bit per L1 block, rather than per L2 block. Thus rather than storing this bit with each L2 entry, we can store it analogous and adjacent to the LRU1 bits as shown, on one island. Thus only one M1 bit 713 per L1 block is required, as is the case for the uncombined L1 directory. We should add one field, the L1 set field, S1 743, for each L2 entry as shown and described previously in detail. This is 1 bit for 2 way, 2 bits for 4 way , 3 bits for 8 way set-associativity, etc. Note again that the LRU1 bits 754 for L1 must only be stored for the actual number of congruence classes in L1. These are stored only on Island 0 as an example. Thus the total number of bits required for a combined, inclusive L1/L2 store-in directory L1/L2 is given by:

$$NB2*[VA+P2+M2+P1+S1]+[LRU2* (NB2/SA2)]+[LRU1*(NB1/SA1)]+M1*NB1=NB2*[VA+3+S1+(LRU2/SA2)]+NB1*[M1+(LRU1/SA1)] \quad (5).$$

The number of bits saved by the combined directory is:

$$\{\text{Bits Saved}=\text{Equa.}(3)+\text{Equa.}(4)-\text{Equa.}(5)\}. \quad (6)$$

After substitution and simplification, we get:

$$\text{Bits Saved}=NB1*[VA+1]-NB2*S1 \quad (7)$$

where:

S1 is 1, 2, 3, etc., bits respectively for a 2, 4, 8-way etc. set-associative L1;

P1 is the L1 valid or present/L2 locked bit, uses 1 bit;

P2 is the L2 valid or present bit, uses 1 bit;

M1 is the L1 block Modified bit, uses 1 bit;

M2 is the L2 block Modified bit, uses 1 bit;

NB1 is the total number of blocks in L1, uses a number of bits equal to the number of blocks in L1;

NB2 is the total number of blocks in L2, uses a number of bits equal to the number of blocks in L2;

SA1=Set-Associativity of L1, uses a number of bits equal to the set-associativity of L1;

SA2=Set-Associativity of L2, uses a number of bits equal to the set-associativity of L2; and VA is the address bits (Virtual or Real) that would have been stored in the separate L1 directory and used for the Hit/Miss compare, uses the number of bits in the VA address. This VA is sometimes larger than the actual VA used for compares in the combined L1/L2 directory, especially if a virtual L1 and L2 is assumed.

Note the actual, total number of bits saved as given by Equation (7) is independent of SA2, the L2 set-associativity, but obviously, the bits in a separate L2 depends on SA2.

Evaluation of Eqs. (3), (4), (5). and (7) for typical values and various combinations of the several important parameters are shown in FIGS. 11–15 for cases where:

VA varies from 20 to 50 bits;

NB2 has 4K and 16K blocks;

NB1 has 1K and 2K blocks; and

SA1 is 2, 4, 8, and 16; and

SA2 is 2 and 8.

Examination of the results, illustrated in FIGS. 11 through 15 show the following. FIG. 11(a) and (b) give the percent bit saving of a combined L1+L2 directory L1/L2 over that of the usual separate L1+L2 directory as a function of the stored VA bits, for several typical L1 set-associativities. FIG. 11(a) shows the case when the ratio of the L2 to L1 cache size is 4K/1K block and L1 set-associativity of SA1=2. In this case the percent bit savings are from 16 to 18% depending on the size of the VA. As the ratio of NB2/NB1 gets larger as illustrated in FIG. 11(b)for the case of NB2/NB1=8, the savings provided by the combined L1/L2 gets smaller for all equivalent cases. This results from the fact that the VA bits saved per NB1 becomes less in proportion to the excess S1 bits required by a large NB2. This is because most of the S1 bits are not used, but the field must be there when needed. In an uncombined directory, we would not need any S1 bits. But for the combined case, the number must equal NB2, so the number of S1 bits used gets larger as NB2 becomes larger.

Figure 11A:
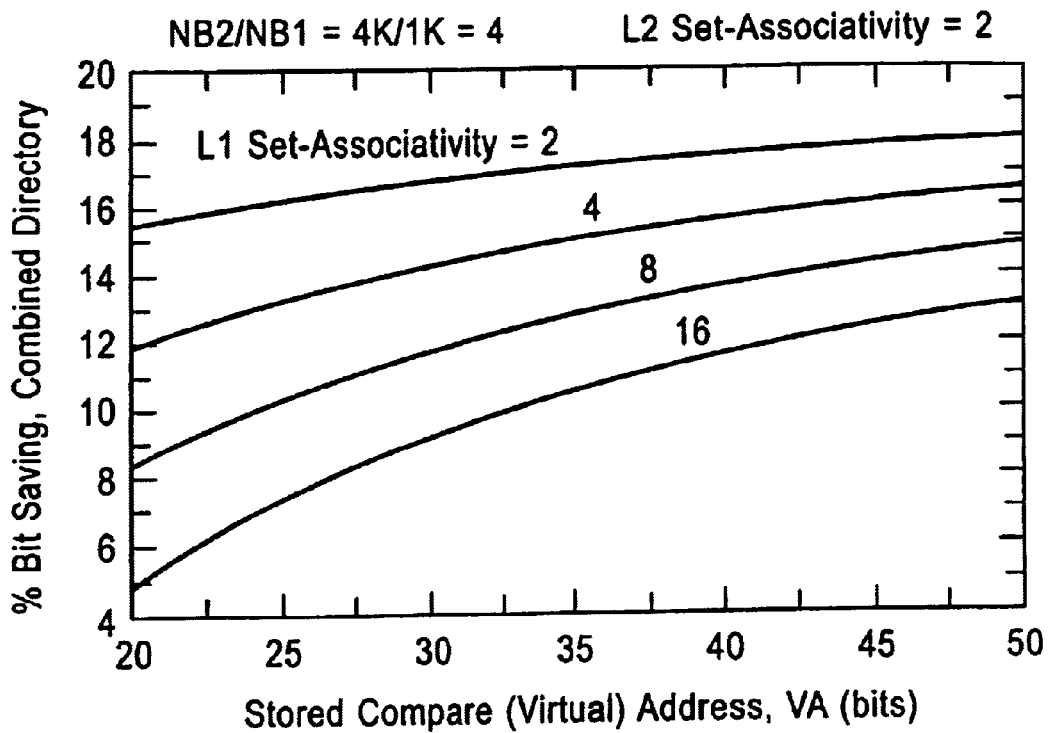
FIG. 11(a) shows percentage bit savings for cases when the ratio of the L2 to L1 cache size is 4K/1K block and L1 set-associativity of SA1=2, in accordance with the present invention.
Figure 11B:
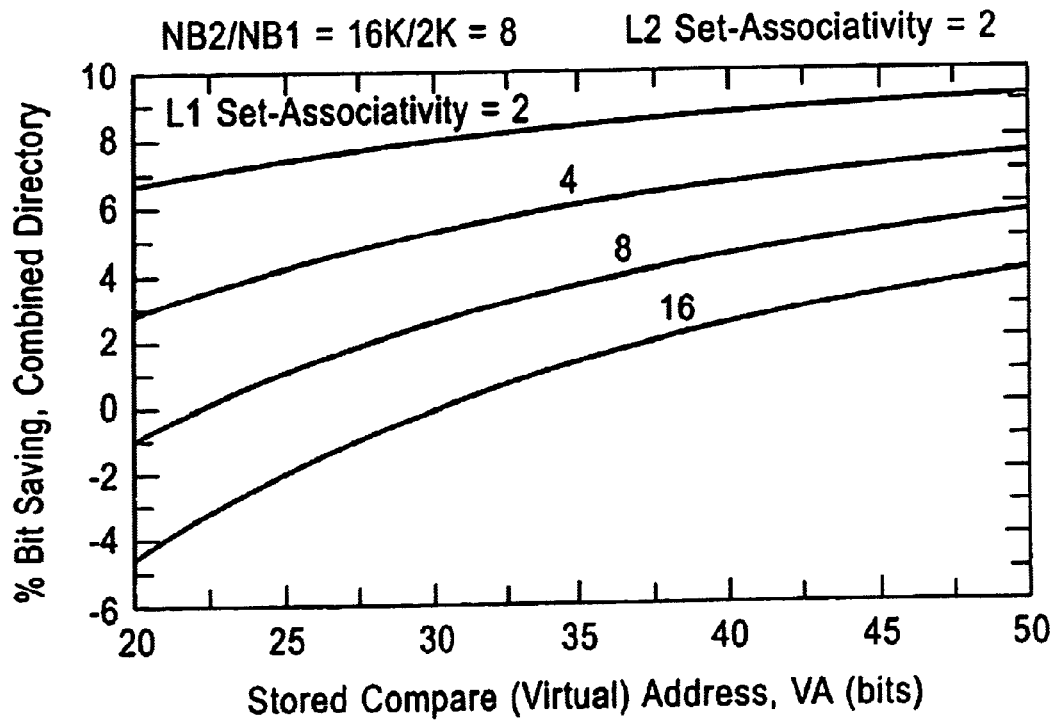
FIG. 11(b) shows percentage bit savings for cases when the ratio of the L2 to L1 cache size is 16K/2K block and L1 set-associativity of SA1=2, in accordance with the present invention.
Figure 12:
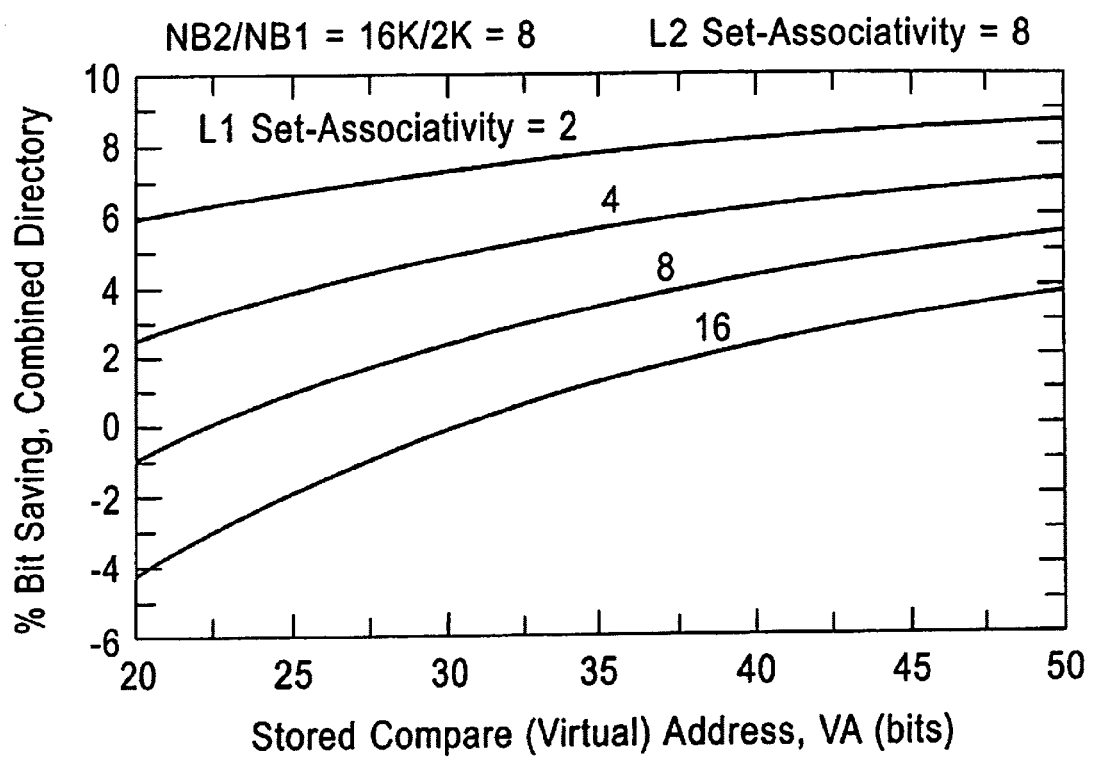
FIG. 12 shows percentage bit savings for cases when the ratio of the L2 to L1 cache size is 4K/1K block and L1 set-associativity of SA1=8, versus the VA bits, in accordance with the present invention.

It can further be seen from FIGS. 11(a) and 11(b) that the greatest saving is obtained for smaller NB2/NB1 size ratios, for smaller L1 set-associativity and larger stored VA. Conversely, minimal saving is obtained for parameters in the opposite direction. The savings can become negative if the parameters become too extreme as shown in FIG. 11(b) for large NB2/NB1, small VA and large SA1.

The L2 set-associativity equal to 2 is used in FIGS. 11(a) and 11(b), but it should be noted that the results are not very sensitive to SA2. This is observed by comparing FIG. 12 for the case in which SA2 is 8 to the results of FIG. 11-(b). This shows only a very small degradation in percent savings for SA2=8, versus SA2=2.

Figure 13A:
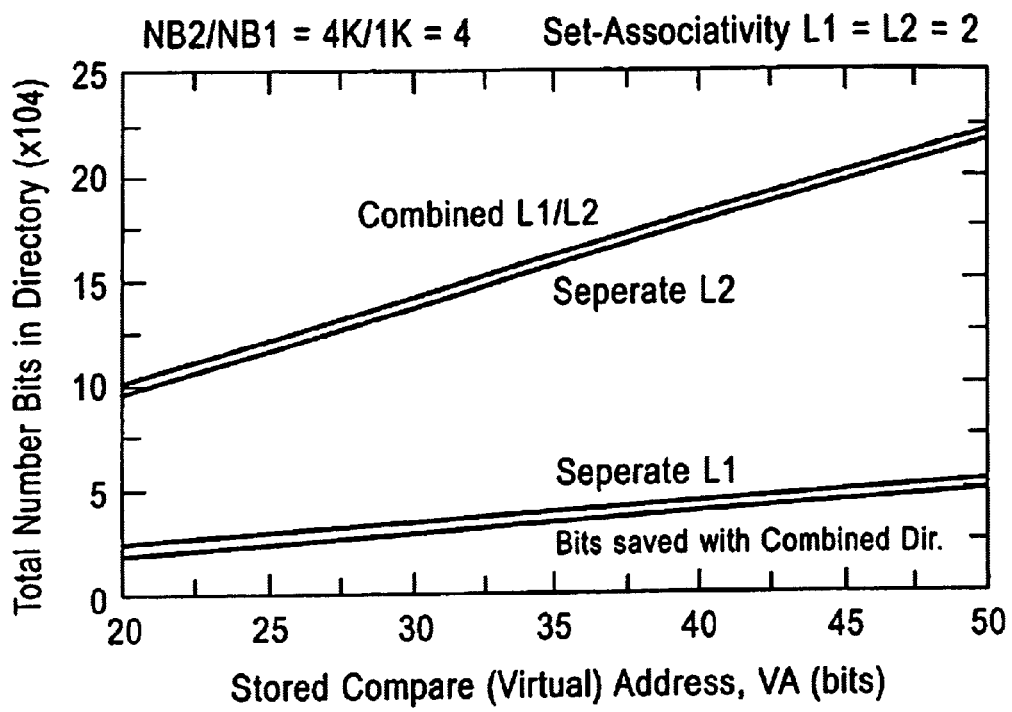
FIG. 13(a) shows the total number of bits in various directories versus the number of stored VA bits, when NB2/NB1=4, in accordance with the present invention.
Figure 13B:
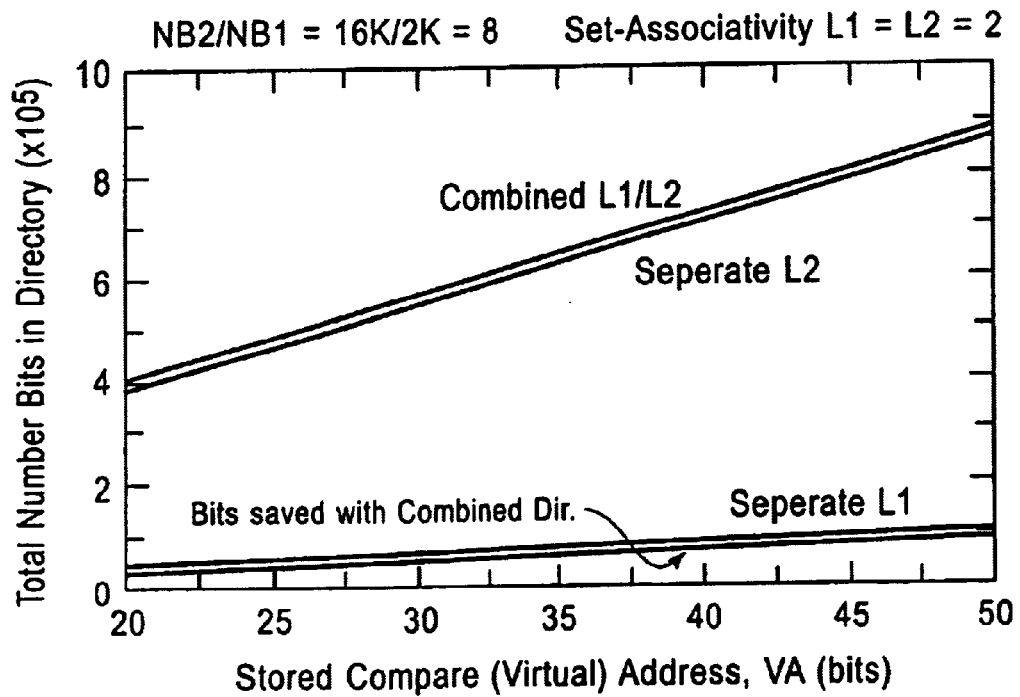
FIG. 13(b) shows the total number of bits in various directories versus the number of stored VA bits, when NB2/NB1=8, in accordance with the present invention.
Figure 14:
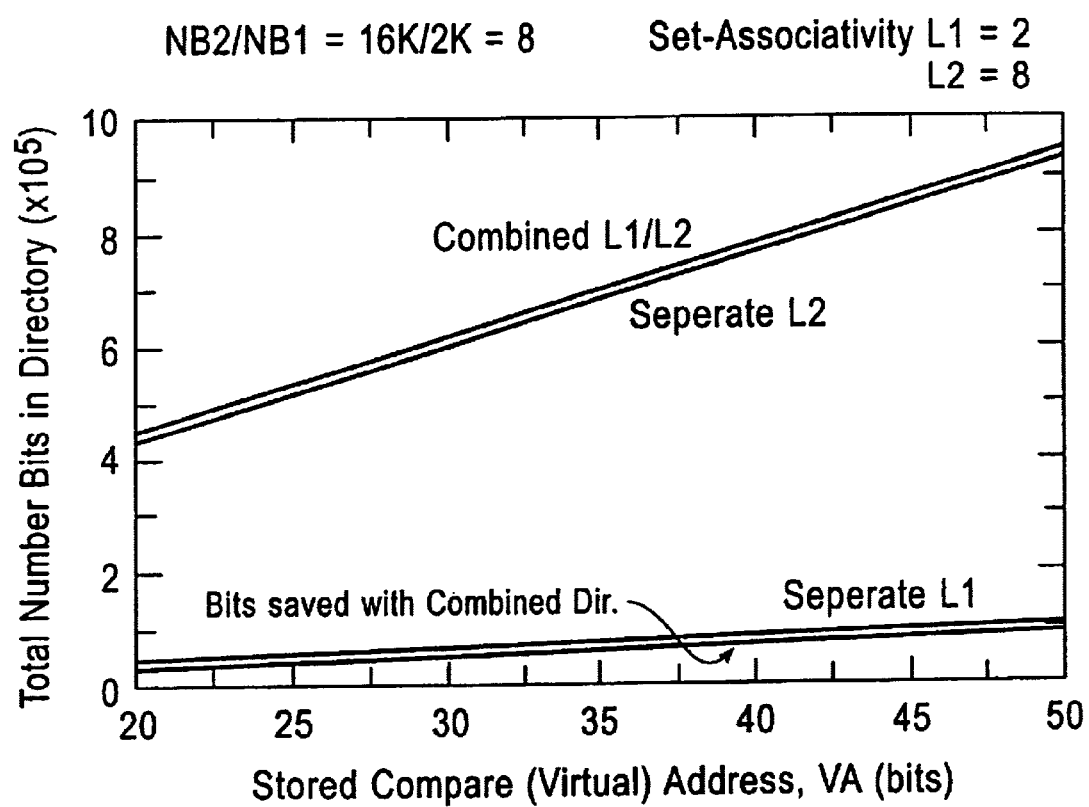
FIG. 14 shows the total number of bits in various directories versus the number of stored VA bits, when NB2/NB1=8, for set-associativities of L1=2 and L2=8. in accordance with the present invention.
Figure 15A:
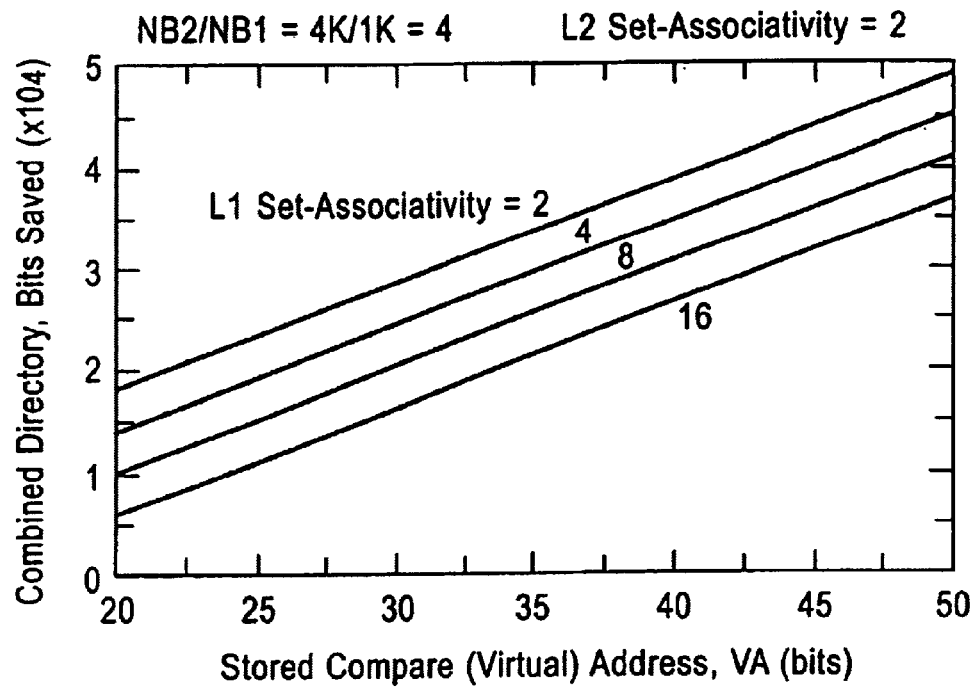
FIG. 15(a) shows the bits saved in L1/L2 directories versus the number of stored VA bits, when NB2/NB1=4, for set-associativities of L1=2,4,8 and 16, in accordance with the present invention.
Figure 15B:
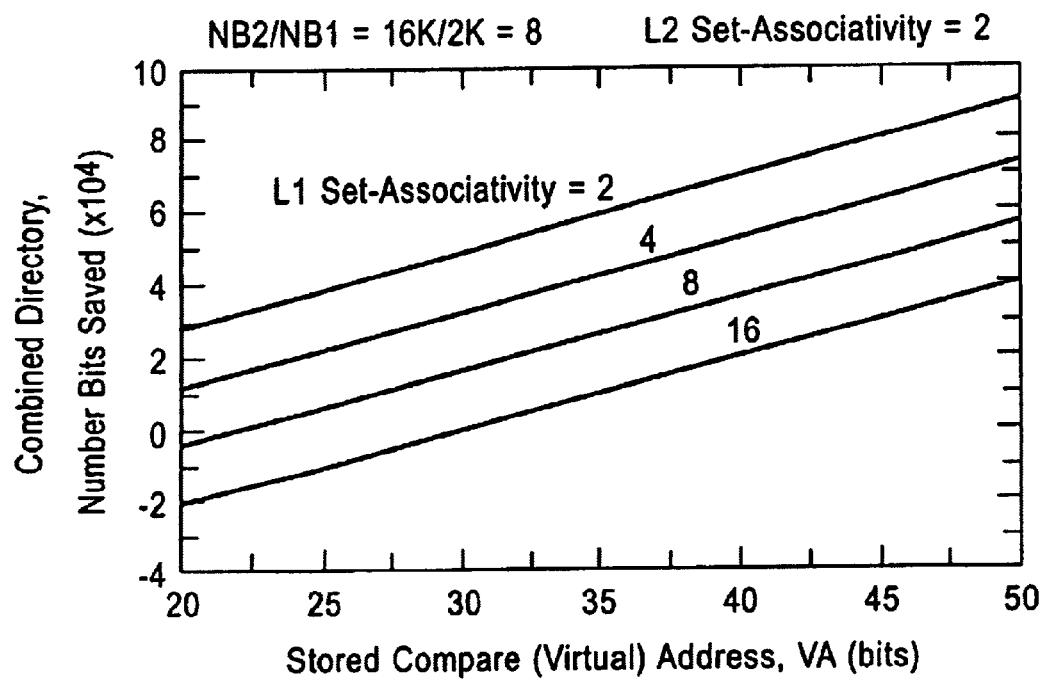
FIG. 15(b) shows the bits saved in L1/L2 directories versus the number of stored VA bits, when NB2/NB1=8, for set-associativities of L1=2,4,8 and 16, in accordance with the present invention.

In all cases, as the VA gets larger, the combined directory saves more. This is simply a result of the fact that the VA field in L1 is eliminated and supplied by the VA field in what would be the L2, which must be there in any case. This can be a substantial savings, and is more so for a virtual L1 than for a real L1 because the VA is larger for a virtual cache. FIGS. 13(a), 13(b) and 14 give the actual sizes in bits, of various cache combinations used in FIGS. 11(a), 11(b) and 12, respectively. FIGS. 15(a) and 15(b) show a magnified view of FIGS. 13(a) and 13(b) respectively for the curve bits saved with "Combined L1/L2" directory and for some additional cases having different L1 set-associativities. It can be seen that the actual bit savings can be substantial for a wide range of cases.

Thus it is realized that on any processor chip, the silicon area is an extremely important cost factor. Any method which saves real estate is of importance. When two or more levels of a memory hierarchy are included on the processor chip, a combined directory provided in accordance with the present invention results in savings which may be crucial in some cases. In addition to the savings in area, the combined directory requires only the number of compares equal to the set-associativity of the L2. Thus a 4 way L1 and 2 way L2 cache would only require 2 compares for either the L1 or L2 access in a combined directory. In this case, the same circuits can be used for both directory accesses. This eliminates all the L1 compares. The resulting saving in compare circuitry size and power, becomes more significant as the VA increases. This circuitry and power savings can be used to enable an increase in the speed of the compare circuits by allowing the use of larger devices. In some embodiments this may even dissipate less power than would have been required with the larger number of compares in a non combined directory. In an embodiment where the set-associativity of the L1 is increased to 8 while L2 remains at 2, we save the 8 compares although the directory bits savings is less. whether this tradeoff is or is not desirable depends on the particular implementation case.

There are a number of other possibilities which require further exploration. For instance, when an access is made to all the directory islands for an L1 replacement, all the information concerning blocks in both L1 and L2 are simultaneously available. Such a view could be useful in ways that improve the hierarchy reloading and updating performance.

Figure 5A:
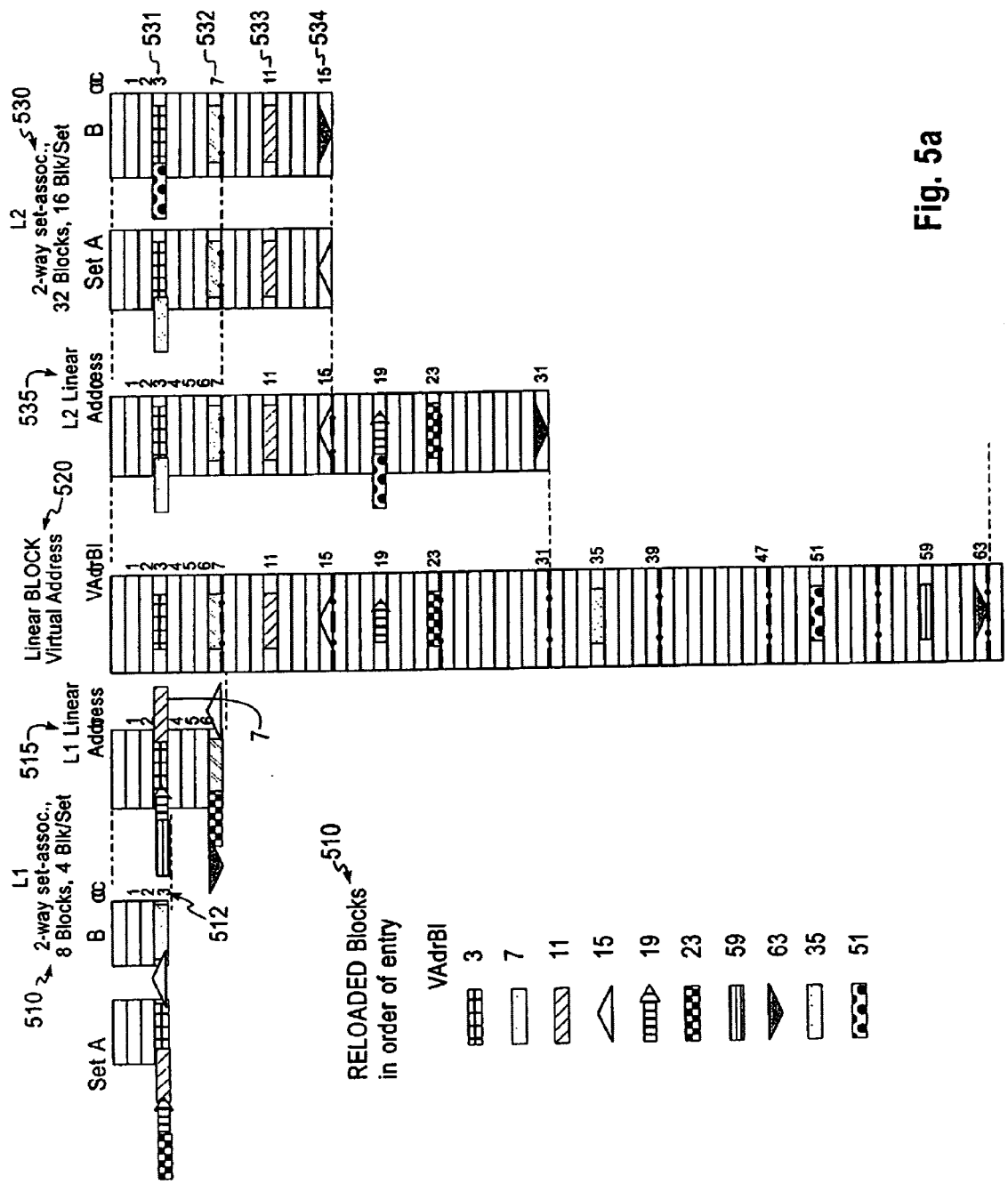
FIG. 5(a) shows a first case for a combined L1/L2 directory for simple memory hierarchy in accordance with the present invention.
Figure 5B:
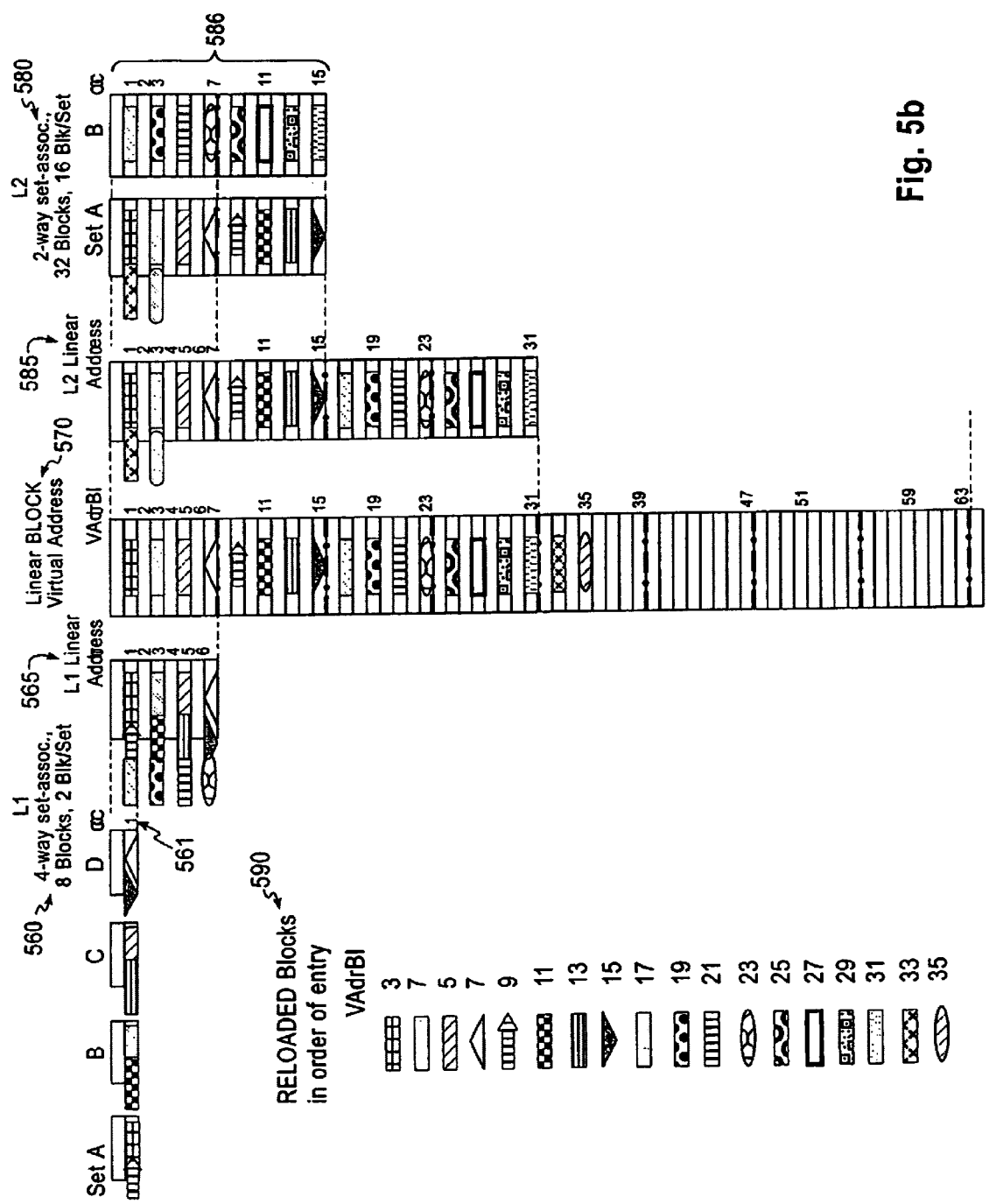
FIG. 5(b) shows a case for L1 having 4-way set-associativity in accordance with the present invention.

FIG. 5(a) is useful to define the words "set" and "congruency class" as used herein. Referring to FIG. 5(a), a 2-way set-associative L1 cache is shown which has a total of 8 blocks organized into 4 congruence classes, CC0 through CC3. Each congruence class has 2 sets, A and B, hence 2-way set-associative.

It is noted that this invention may be used for many applications. Thus although the description is made for particular arrangements and applications, the intent and concept of the invention is suitable and applicable to other arrangements and applications. For example, the types, sizes and shapes of directories being combined occur in various combinations.

The concepts may be expanded for combining three or more directories and/or arrays into a single directory and/or array. This requires the single directory and/or array to contain only the bits necessary to perform the functions of the virtual directories it combines. It will be clear to those skilled in the art that other modifications to the disclosed embodiments can be effected without departing from the spirit and scope of the invention.

APPENDIX A

The rational for the use of the words 'Congruence Class' and 'Set' as per FIG. 5(a) comes from the mathematical definition of congruence. Congruence in mathematics is a relation between two numbers indicating that the numbers give the same remainder when divided by some given number.

We apply this definition to FIG. 5(a) to show that this is exactly the definition of congruence as used herein. Start with two block number from the L1 linear space, such as Block 3 and Block 15. To find the congruence class, we simple use the residue or remainder operator MODULUS as follows:

2 MOD 4=2; and 14 mod 4=2.

Since both 2 and 14 give the same remainder or residue after division by the same number (4), they MUST be congruent as per the mathematical definition. So we call this number 2 the congruence class 2. Similarly, Block numbers 1 and 13 divided by the same number, 4, give 1 so they both fall into congruence class 1. More generally, we can define:

Congruence Class=block# MOD (#congruence classes in Cache).

What is claimed is:

1. An architecture for a first and second level memory hierarchy comprising:

a first data storage array to serve the first level memory hierarchy (L1);

a second data storage array to serve the second level memory hierarchy (L2);

wherein said first data storage array is smaller and has a same organization and set-associativity with respect to said second data storage array;

a single address translation directory to serve the directory requirements of the first and second level memory hierarchy in a single directory satisfying the organization requirements of both said first and second level memory hierarchy;

said single address translation directory providing an apparent set-associativity of the first level memory hierarchy to be the same as that of the second level memory hierarchy; and said single directory employs a set of address decoders and compare circuits for performing address translation of both the first and second level memory hierarchy;

and wherein said translation directory is comprised of islands, each of said islands includes a number of blocks equal to that in said first level memory hierarchy, each said island having one set of address decoders and sensing circuits which are used for both a first and second level translation and replacement lookup and wherein the single directory is comprised of a plurality of islands, each of said islands includes a number of blocks equal to that in the first level memory hierarchy, and all of the islands share common compare circuits for both the first and second memory hierarchy and where the number of compares necessary regardless of said first level hierarchy is equal to the set-associativity of said second level hierarchy; achieve a smaller size; and whereby said (L1) and (L2) structures are combined logically and physically to achieve a reduction in total directory size without compromising (L1) speed.

2. An architecture as recited in claim 1, wherein the first data storage array is smaller and having a same organization and set-associativity with respect to the second data storage array, the single address translation directory providing an apparent set-associativity of the first level memory hierarchy to be the same as that of the second level memory hierarchy.

3. An architecture as recited in claim 1, wherein the single directory employs a set of address decoders and compare circuits for performing address translation of both the first and second level memory hierarchy.

4. An architecture as recited in claim 1, wherein the translation directory is comprised of islands, each of the islands includes a number of blocks equal to that in the first level memory hierarchy, each island having one set of address decoders and sensing circuits which are used for both a first and second level translation and replacement lookup.

5. An architecture as recited in claim 1, wherein the single directory is comprised of a plurality of islands, each of the islands includes a number of blocks equal to that in the first level memory hierarchy, and all of the islands share common compare circuits for both the first and second memory hierarchy.

6. An architecture as recited in claim 1, wherein the single directory is organized into islands, with each island containing a number of blocks equal to that in the first level memory hierarchy, and where the number of compares necessary regardless of the set-associativity of the first level memory hierarchy is equal to the set-associativity of the second level memory hierarchy.

7. An architecture as recited in claim 1, wherein the single directory is comprised of a plurality of islands, with each of the islands including a number of blocks equal to that in the first level memory hierarchy, and wherein LRU replacement information for a Miss in the first level is contained in only one of the islands of the single directory.

8. An architecture for a first and second level memory hierarchy comprising:

a single storage array serving both the first and second levels of the memory hierarchy;

said single storage array comprising a plurality of islands, each of said islands includes a first number of blocks equal to a second number of blocks identified in each of said islands such that any access to said first memory level hierarchy requires accessing data only out of one of said islands of the single combined storage array;

a single, address translation directory to serve the directory requirements of the first and second level memory hierarchy in a single directory satisfying the organization requirements of both said first and second level memory hierarchy and operating cooperatively with the single storage array.

* * * * *